US 8,475,872 B2

(12) United States Patent
Kang et al.

(10) Patent No.: US 8,475,872 B2
(45) Date of Patent: Jul. 2, 2013

(54) PATTERNING OF THIN FILM LAYERS

(75) Inventors: Sunggu Kang, San Jose, CA (US); Lili Huang, San Jose, CA (US); Steven Porter Hotelling, San Jose, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 688 days.

(21) Appl. No.: 12/626,536

(22) Filed: Nov. 25, 2009

(65) Prior Publication Data

US 2011/0043383 A1 Feb. 24, 2011

Related U.S. Application Data

(60) Provisional application No. 61/235,302, filed on Aug. 19, 2009.

(51) Int. Cl.
*B05D 1/32* (2006.01)

(52) U.S. Cl.
USPC ............. 427/282; 257/98; 438/648; 438/652; 438/717; 438/720; 438/742; 349/48; 349/187

(58) Field of Classification Search
USPC ................... 427/282; 257/98; 438/648, 652, 438/717, 720, 736, 742; 349/48, 187
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,255,130 B1 | 7/2001 | Kim |
| 6,310,610 B1 | 10/2001 | Beaton et al. |
| 6,323,846 B1 | 11/2001 | Westerman et al. |
| 6,327,011 B2 | 12/2001 | Kim |
| 6,335,276 B1 | 1/2002 | Park et al. |
| 6,545,319 B2 | 4/2003 | Deane et al. |
| 6,682,961 B1 | 1/2004 | Kim |

(Continued)

FOREIGN PATENT DOCUMENTS

| JP | 2000-163031 A | 6/2000 |
| JP | 2002-342033 A | 11/2002 |

OTHER PUBLICATIONS

U.S. Appl. No. 12/501,390, filed Jul. 10, 2009, by Kang et al.

(Continued)

*Primary Examiner* — Nathan Empie
*Assistant Examiner* — Xiao Zhao
(74) *Attorney, Agent, or Firm* — Morrison & Foerster LLP

(57) ABSTRACT

Simplified patterning of layers of a thin film is disclosed. In some embodiments, the patterning can include patterning a first conductive layer using a patterned dielectric layer as a mask and patterning a second conductive layer using a patterned passivation layer as another mask. In other embodiments, the patterning can include patterning a first conductive layer using a removable photosensitive layer as a mask, patterning a black mask layer using a removable photo mask, and patterning a second conductive layer using a patterned passivation layer as another mask. In still other embodiments, the patterning can include patterning a first conductive layer using a patterned black mask layer as a mask and patterning a second conductive layer using a patterned passivation layer as another mask. An exemplary device utilizing the thin film so patterned can include a touch sensor panel.

18 Claims, 28 Drawing Sheets

U.S. PATENT DOCUMENTS

| | | | |
|---|---|---|---|
| 6,690,387 | B2 | 2/2004 | Zimmerman et al. |
| 6,759,281 | B1 | 7/2004 | Kim et al. |
| 7,015,894 | B2 | 3/2006 | Morohoshi |
| 7,184,064 | B2 | 2/2007 | Zimmerman et al. |
| 7,532,131 | B2 | 5/2009 | Schaefer et al. |
| 7,663,607 | B2 | 2/2010 | Hotelling et al. |
| 2001/0040648 | A1* | 11/2001 | Ono et al. .................. 349/43 |
| 2002/0037646 | A1* | 3/2002 | Lyu .................. 438/689 |
| 2002/0047949 | A1* | 4/2002 | Deane .................. 349/43 |
| 2005/0139922 | A1* | 6/2005 | Kim et al. .................. 257/347 |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2008/0062139 | A1 | 3/2008 | Hotelling et al. |
| 2008/0278787 | A1* | 11/2008 | Sasagawa .................. 359/224 |
| 2009/0266621 | A1 | 10/2009 | Huang et al. |
| 2009/0268118 | A1* | 10/2009 | Chang et al. .................. 349/48 |
| 2009/0273570 | A1 | 11/2009 | Degner et al. |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

CONDUCTIVE BRIDGE 200

BONDING AREA 300

CONDUCTIVE BRIDGE 1000

BONDING
AREA
1100

CONDUCTIVE BRIDGE 1300

PATTERNING OF THIN FILM LAYERS

CROSS REFERENCE TO RELATED APPLICATIONS

This application claims priority to U.S. Provisional Patent Application No. 61/235,302, filed Aug. 19, 2009, the contents of which being incorporated herein in their entirety for all purposes.

FIELD

This relates generally to thin film patterning, and more particularly, to the simplified patterning of one or more layers of a thin film.

BACKGROUND

The conventional process for patterning layers on a thin film can require a pattern-forming photo mask for each layer, which can result in a relatively large number of masks. For example, patterning a thin film can including patterning a black mask layer, a metal layer, a dielectric layer, a conductive layer, and a passivation layer, where the black mask layer can require a first photo mask to form its pattern, the metal layer can require a second photo mask to form its pattern, the dielectric layer can require a third photo mask to form its pattern, the conductive layer can require a fourth photo mask to form its pattern, and the passivation layer can require a fifth photo mask to form its pattern.

This conventional process can become complex when patterning thin film layers of a touch sensor panel because such patterning can require a photo mask (and sometimes multiple photo masks) for each layer, particularly for patterning conductive drive and sense lines and bonding areas of the panel. Requiring a photo mask for each thin film layer can increase the amount of time needed to form the thin film patterns, the amount of material needed, the amount of equipment needed, the power consumption, the associated costs, and so on.

SUMMARY

This relates to simplified patterning of layers of a thin film used in devices such as touch sensor panels. The patterning can include patterning a first conductive layer using a patterned dielectric layer as a mask and patterning a second conductive layer using a patterned passivation layer as another mask. In addition or alternatively, the patterning can include patterning a first conductive layer using a removable photosensitive layer as a mask, patterning a black mask layer using a removable photo mask, and patterning a second conductive layer using a patterned passivation layer as another mask. In addition or alternatively, the patterning can include patterning a first conductive layer using a patterned black mask layer as a mask and patterning a second conductive layer using a patterned passivation layer as another mask. This simplified patterning can advantageously realize cost, power, and time savings over the conventional process by providing some patterned layers of a thin film as pattern-forming masks for other layers.

BRIEF DESCRIPTION OF THE DRAWINGS

FIGS. 2a-2k illustrate an exemplary conductive bridge formed by simplified patterning of thin film layers according to various embodiments.

DETAILED DESCRIPTION

In the following description of various embodiments, reference is made to the accompanying drawings which form a part hereof, and in which it is shown by way of illustration specific embodiments which may be practiced. It is to be understood that other embodiments may be utilized and structural changes may be made without departing from the scope of the various embodiments.

This relates to patterning of thin film conductive and passivation layers, which can be simpler than patterning in a conventional process. This patterning can be used for touch sensor panels to form conductive bridges between drive and sense conductive traces and to form bonding areas to connect the panel to other circuitry. In some embodiments, the patterning can include patterning a first conductive layer using a patterned dielectric layer as a mask and patterning a second conductive layer using a patterned passivation layer as another mask. In other embodiments, the patterning can include patterning a first conductive layer using a removable photosensitive layer as a mask, patterning a black mask layer using a removable photo mask, and patterning a second conductive layer using a patterned passivation layer as another mask. In still other embodiments, the patterning can include patterning a first conductive layer using a patterned black mask layer as a mask and patterning a second conductive layer using a patterned passivation layer as another mask.

This simplified patterning can advantageously reduce the number of photo masks from that required by the conventional process. Rather, some of the patterned layers can function as masks for underlying layers. This simplified patterning can also reduce the actions required by the conventional process, including mask removal and photosensitive layer deposition, in some instances. Accordingly, this simplified patterning can save cost, power, and time over the conventional process.

Although various embodiments are described and illustrated herein in terms of touch sensor panels, it should be understood that the embodiments are not so limited to such panels, but are generally applicable to panels utilizing other touch and proximity sensing technologies, and any device for which thin film layer patterning can be applied.

Figure 1:
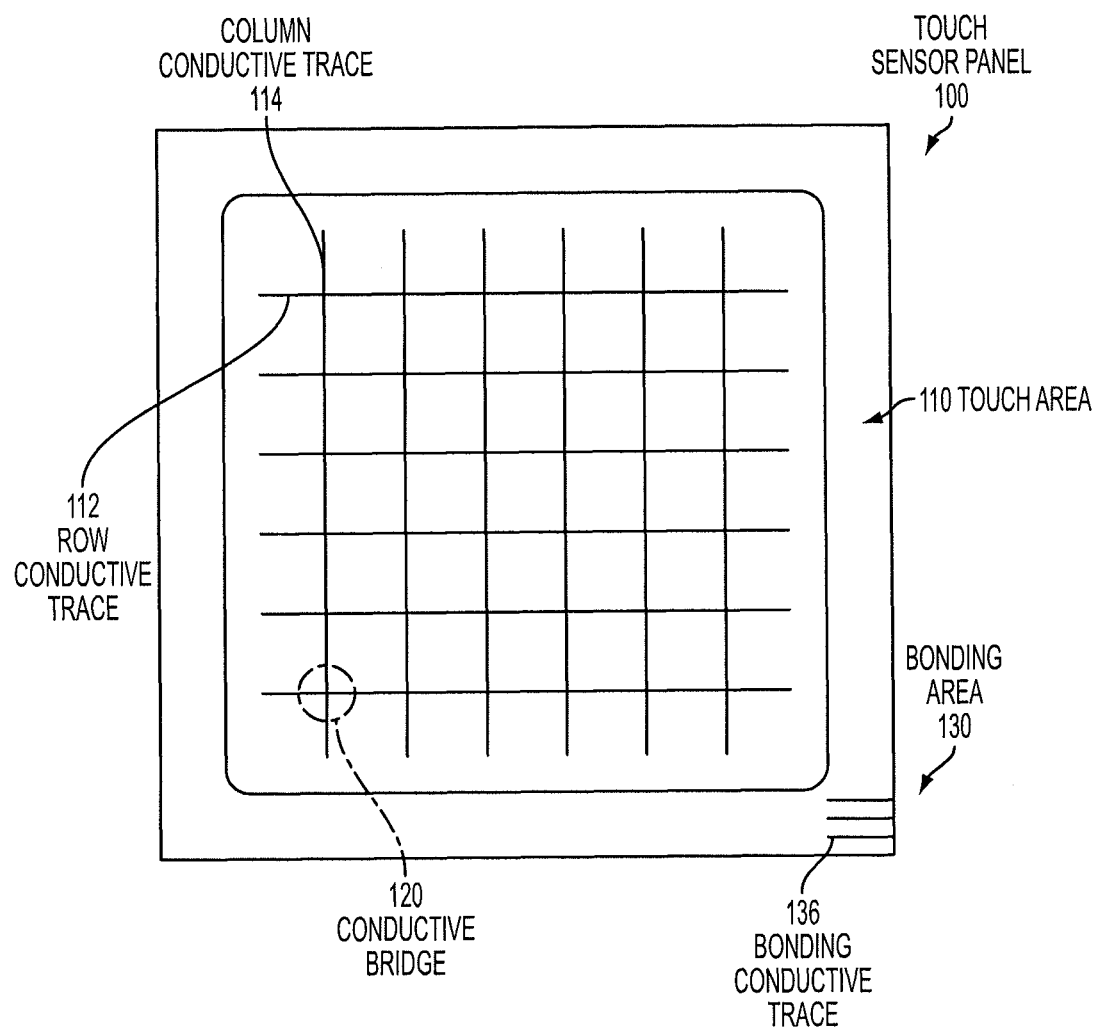
FIG. 1 illustrates an exemplary touch sensor panel having conductive bridges and bonding areas formed by simplified patterning of thin film layers according to various embodiments.

FIG. 1 illustrates an exemplary touch sensor panel having conductive bridges and bonding areas formed by simplified patterning of thin film layers according to various embodiments. In the example of FIG. 1, touch sensor panel 100 can include touch area 110. The touch area 110 can include multiple row conductive traces 112 and column conductive traces 114, forming touch sensors that can be used to sense a touch at the touch area. The row traces 112 and the column traces 114 can be formed to cross each other on a thin film. To minimize physical contact between the traces 112, 114 which could adversely affect operation of the panel 100, conductive bridge 120 can be formed at each crossing. The conductive bridge 120 can include one or more thin film layers, including a black mask layer, a metal layer, a dielectric layer, a conductive layer, and/or a passivation layer. The black mask layer can include a black material, e.g., carbon black, titanium black, and the like, and a polymer material, e.g., molybdenum, polyamide, and the like, to provide a cosmetic, aesthetic look of the panel 100. In some embodiments, the black mask layer can be a photosensitive material. The metal layer can include a sufficiently conductive metal to conduct electrical signals. The dielectric layer can include a dielectric material to insulate conductive components of the panel 100. In some embodiments, the dielectric layer can be a photosensitive material. The conductive layer can include a conductive material, e.g., indium-tin-oxide (ITO), to conduct electrical signals. The passivation layer can include a polymer material, e.g., polyamide and the like, to protect underlying material, such as the metal layer, from damage that could be caused by the environment or downstream processes. In some embodiments, the passivation layer can be a photosensitive material. The conductive bridge 120 can be formed using simplified patterning of the thin film layers according to various embodiments. Example conductive bridge formations will be described later.

In operation, the conductive bridge 120 can conduct electrical signals along crossing row trace 112 and column trace 114 without the signals interacting in a way that could adversely affect the touch panel operation. The row conductive trace 112 can conduct electrical signals along one path of the conductive bridge 120, for example, along a lower portion of the bridge, to drive the touch sensor panel 100. The column conductive trace 114 can conduct electrical signals along another path of the conductive bridge 120, for example, along an upper portion of the bridge, to transmit signals indicative of a touch at the panel 100. Alternatively, the column trace 114 can conduct drive signals and the row trace 112 can conduct touch signals and/or the column trace can conduct along the lower portion of the bridge and the row trace can conduct along the upper portion of the bridge.

The touch sensor panel 100 can also include bonding area 130. The bonding area 130 can include multiple bonding conductive traces 136, forming input/output connections for other circuitry, e.g., flex circuits, controllers, processors, and the like, to bond to the touch sensor panel 100. The conductive traces 116 can be formed near a boundary of a thin film in parallel or near parallel lines, for example. The bonding area 130 can include one or more thin film layers, including a black mask layer, a metal layer, and/or a conductive layer. So that the bonding traces 136 can electrically connect with other circuitry, the metal layer and/or the conductive layer can be exposed on the thin film. The bonding area 130 can be formed using simplified patterning of thin film layers according to various embodiments. Example bonding area formations will be described later.

In operation, the bonding area 130 can conduct electrical signals back and forth along the bonding traces 136 between the touch sensor panel 100 and other circuitry. Example signals can include the touch signals from the touch area 110, commands from a controller to search for a touch, and so on.

It is to be understood that the touch sensor panel of FIG. 1 is not limited to that shown, but can include other components, configurations, and operations according to various embodiments.

Figure 2A:
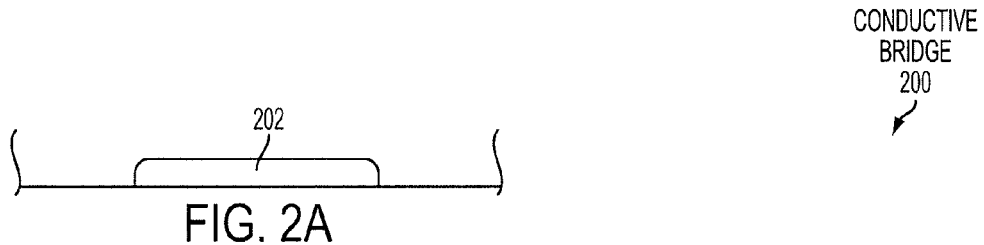
Figure 2B:
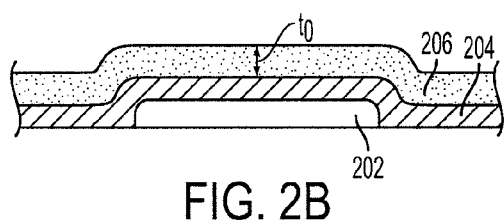
Figure 2C:
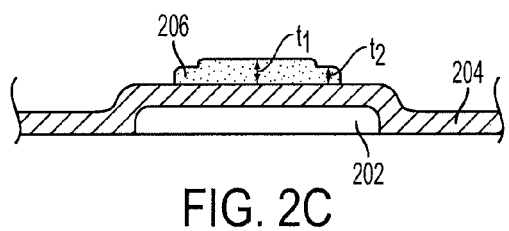
Figure 2E:
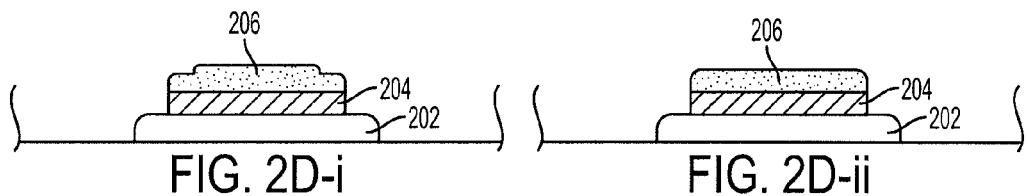
Figure 2E:
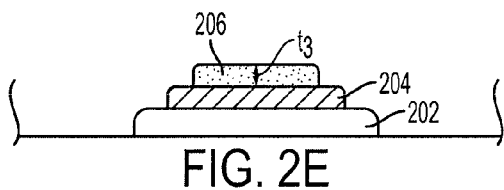

FIGS. 2a-2k illustrate an exemplary conductive bridge of a touch sensor panel formed by simplified patterning of thin film layers according to various embodiments. FIGS. 2d(ii), 2f(ii), and 2g(ii) illustrate transversal cross sections of conductive bridge 200 and the remaining FIGs. illustrate longitudinal cross sections of the bridge. In the example of FIG. 2a, black mask layer 202 can be patterned onto a thin film substrate. The black mask layer 202 can be patterned, for example, by coating the thin film substrate with a black mask material, applying a removable photo mask to the black mask material, exposing the applied photo mask to light, and developing the black mask material into the pattern of the applied photo mask. Photo masks will be described in more detail later in FIGS. 4a-4b and 5. In the example of FIG. 2b, metal layer 204 can be deposited on the patterned black mask layer 202 and dielectric layer 206 can coat the metal layer at thickness $t_o$. In the example of FIG. 2c, the dielectric layer 206 can be patterned on the metal layer 204 to have first thickness $t_1$ near the center portion of the pattern and second thickness $t_2$ near the edge portions of the pattern, where $t_o > t_1 > t_2$. The dielectric layer 206 can be patterned, for example, by exposing an applied photo mask to light and developing the dielectric layer into the pattern of the applied photo mask. In the example of FIGS. 2d(i) (the longitudinal cross section) and 2d(ii) (the transversal cross section), the metal layer 204 can be etched. Here, rather than using a photo mask as in the conventional process, the patterned dielectric layer 206 can function as an etching mask for the underlying metal layer 204, resulting in a simplified patterning. In the example of FIG. 2e, the $t_2$-thickness portions of the dielectric layer 206 can be removed and the $t_1$-thickness portion can be reduced to thickness $t_3$, where $t_1>t_3>t_2$. This can be done, for example, by ashing using oxygen plasma.

Figure 2H:
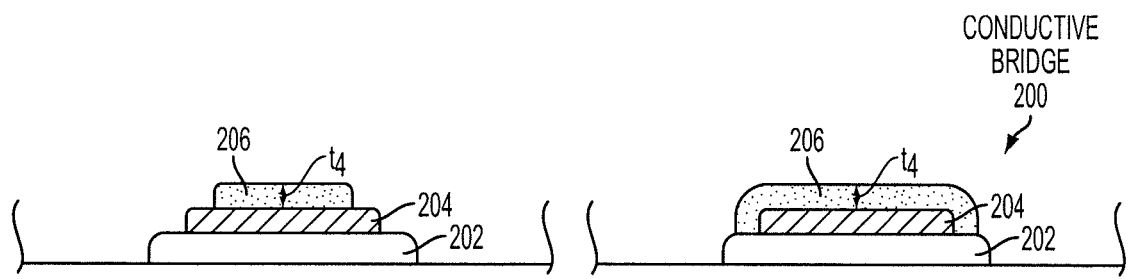
Figure 2H:
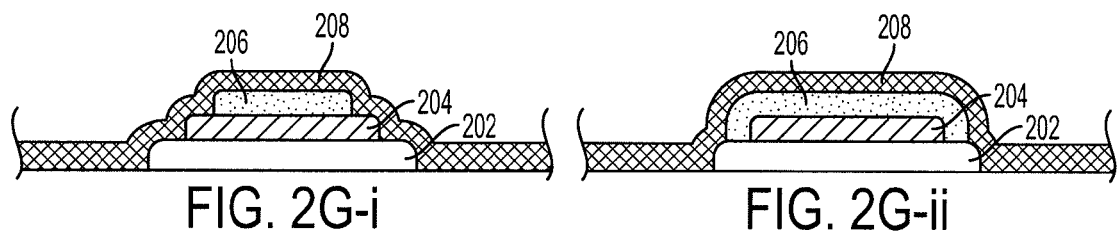
Figure 2H:
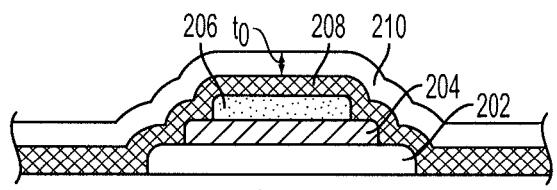
Figure 2I:
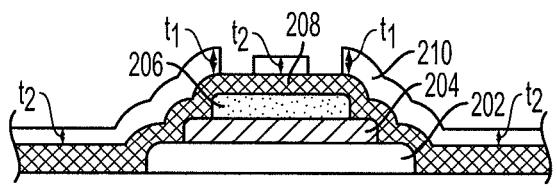
Figure 2J:
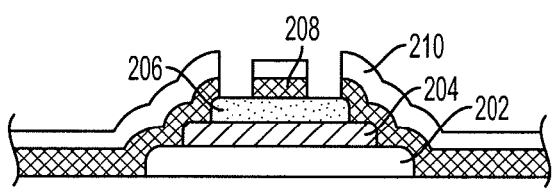
Figure 2K:
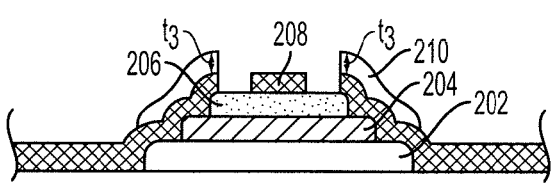

In the example of FIGS. 2f(i) (the longitudinal cross section) and 2f(ii) (the transversal cross section), the dielectric layer 206 can be cured to thickness $t_4$, where $t_3>t_4$. During curing, the dielectric layer 206 can be heated to a temperature at which the layer becomes soft and flows over the underlying metal layer 204 along a transversal profile, as shown in FIG. 2f(ii). In the example of FIGS. 2g(i) (the longitudinal cross section) and 2g(ii) (the transversal cross section), conductive layer 208 can be deposited over the cured dielectric layer 206. In the example of FIG. 2h, passivation layer 210 can coat the conductive layer 208. The passivation layer 210 can have thickness $t_o$ and can be a photosensitive material and either organic or inorganic. In the example of FIG. 2i, the passivation layer 210 can be developed into a pattern having portions of the layer removed to form a center portion having thickness $t_2$ and to form left and right portions having thickness $t_1$ near the center portion and thickness $t_2$ farther away, where $t_o>t_1>t_2$. The passivation layer 210 can be patterned by, for example, exposing an applied photo mask to light and developing the passivation layer into the pattern of the applied photo mask. In the example of FIG. 2j, the conductive layer 208 can be etched to form left and right portions that can be a row trace and a center portion that can be a column trace. Here, rather than using a photo mask as in the conventional process, the patterned passivation layer 210 can function as the etching mask for the conductive layer 208, resulting in a simplified patterning. In the example of FIG. 2k, excess passivation layer 210 can be removed, e.g., by ashing using oxygen plasma, such that the $t_2$-thickness portions of the layer can be removed and the tj-thickness portions can be reduced to thickness $t_3$, where $t_1>t_3>t_2$. The resulting conductive bridge 200 can transmit electrical signals of a touch sensor panel, as described previously.

Figure 3A:
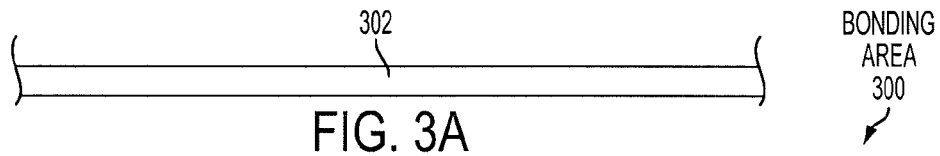
FIGS. 3a-3g illustrate an exemplary bonding area formed by simplified patterning of thin film layers according to various embodiments.
Figure 3B:
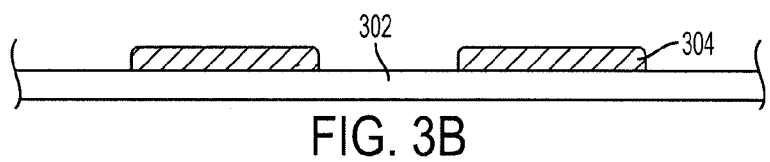
Figure 3C:
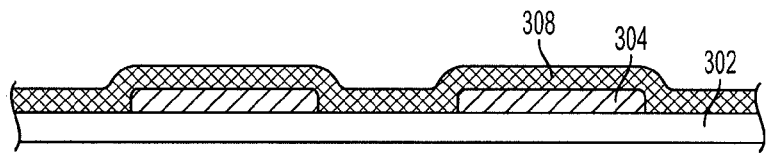
Figure 3D:
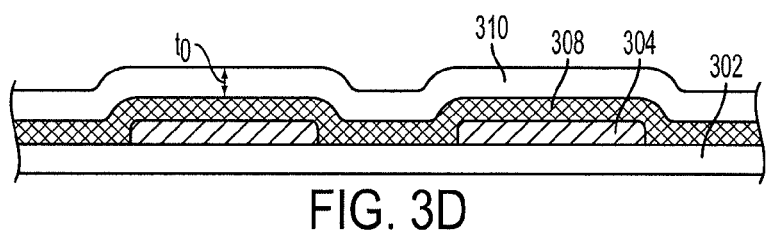
Figure 3E:
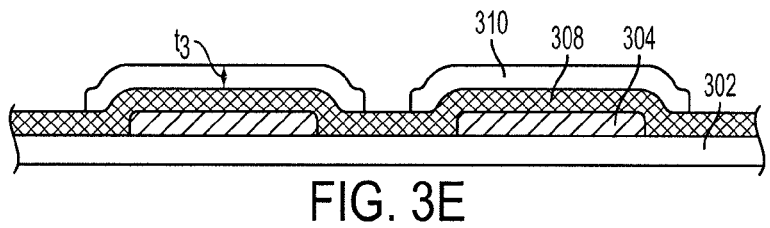
Figure 3F:
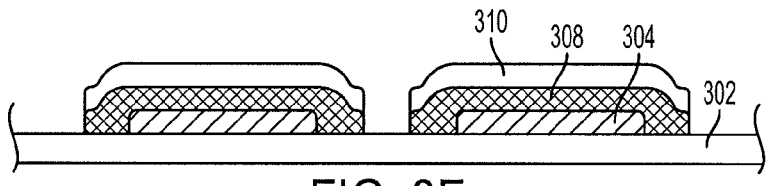
Figure 3G:
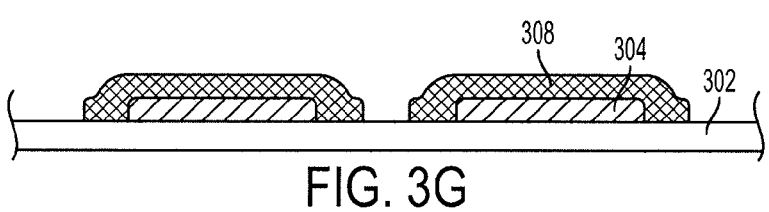

FIGS. 3a-3g illustrate an exemplary bonding area of a touch sensor panel formed by simplified patterning of thin film layers according to various embodiments. In the example of FIG. 3a, black mask layer 302 can be deposited on a thin film substrate. In the example of FIG. 3b, metal layers 304 can be patterned onto the black mask layer 302. The metal layers 304 can be patterned, for example, by depositing the metal material on the black mask layer, applying a removable photo mask to the metal material, exposing the applied photo mask to light, and developing the metal material into the pattern of the applied photo mask. In the example of FIG. 3c, conductive layer 308 can be deposited over the metal layers 304. In the example of FIG. 3d, passivation layer 310 can be deposited on the conductive layer 308 and can have thickness $t_o$. In the example of 3e, the passivation layer 310 can be developed into a pattern having separate portions with thickness $t_3$, where to $>t_3$. The passivation layer 310 can be patterned, for example, by exposing an applied photo mask to light and developing the passivation layer into the pattern of the applied photo mask. In the example of FIG. 3f, the conductive layer 308 can be etched to form a pattern for bonding conductive traces. Here, rather than using a photo mask as in the conventional process, the patterned passivation layer 310 can function as the etching mask for the conductive layer 308, resulting in a simplified patterning. In the example of FIG. 3g, the remaining passivation layer 310 can be removed, e.g., by ashing, such that the conductive layer 308 can be available for bonding with other circuitry.

The simplified patterning of FIGS. 2a-2k and 3a-3g can be performed concurrently. The black mask layers 202, 302 can be deposited onto the thin film substrate as in FIGS. 2a and 3a. The metal layers 204, 304 can be deposited onto the black mask layers 202, 302 as in FIGS. 2b and 3b. The dielectric layer 206 can be deposited onto the metal layer 204 as in FIG. 2b. The dielectric layer 206 and the metal layer 204 can be patterned as in FIGS. 2c-2f. The conductive layers 208, 308 can be deposited as in FIGS. 2g and 3c. The passivation layers 210, 310 can be deposited with thickness $t_o$ as in FIGS. 2h and 3d. The passivation layers 210, 310 can be patterned as in FIGS. 2i and 3e. The conductive layers 208, 308 can be etched to form conductive patterns as in FIGS. 2j and 3f. Excess portions of the passivation layer 210, 310 can be removed as in FIGS. 2k and 3g. In this simplified patterning, the number of removable photo masks could be reduced from at least five, as in the conventional process, to no more than three (e.g., for black mask, dielectric, and passivation layer patterning).

It is to be understood that patterning is not limited to that illustrated here, but can include other and/or additional components according to various embodiments.

It is further to be understood that the black mask layers 202, 302 can be optional. As such, the conductive bridge and the bonding area can be formed, beginning with a metal layer deposited on a thin film substrate. Examples of thin film layers without black mask layers are described in U.S. patent application Ser. No. 12/501,390, entitled "Patterning of Thin Film Conductive and Passivation Layers," the contents of which being incorporated by reference herein for all purposes.

Figure 4A:
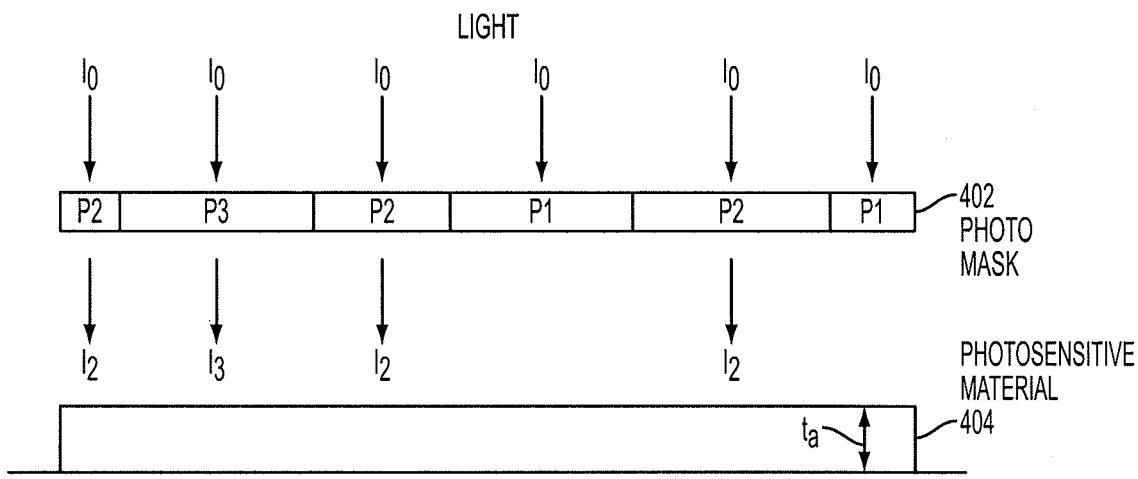
FIGS. 4a-4b illustrate an exemplary patterning of a photosensitive material using an exemplary photo mask according to various embodiments.
Figure 4B:
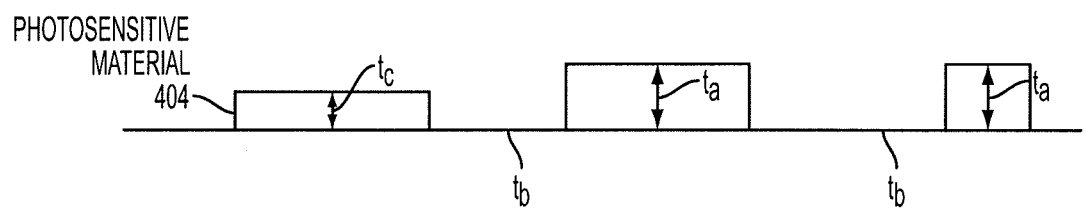

FIGS. 4a-4b illustrate an exemplary patterning of a photosensitive material using an exemplary photo mask according to various embodiments. In the example of FIG. 4a, photo mask 402 can include portions having various transparencies (also known as a half-tone mask). In this example, portion P1 can be black or non-transparent, portion P2 can be clear or transparent, and portion P3 can be gray or semi-transparent. The amount of transparency of each portion can determine the light intensity transmitted through that portion of the photo mask 402. Here, the photo mask 402 can be exposed to light having an intensity $I_o$. Because portion P1 is non-transparent, this portion can not transmit any of the light. Because portion P2 is transparent, this portion can transmit light at an intensity $I_2$ close to the original intensity $I_o$, where $I_2<I_o$. Because portion P3 is semi-transparent, this portion can transmit light at a lower intensity $I_3$ than either $I_2$ or $I_o$, where $0<I_3<I_2<I_o$. Photosensitive material 404 can have an initial thickness $t_a$. When the light at various intensities hit the photosensitive material 404, the light can trigger a chemical reaction of the material proportionate to the light's intensity, thereby eliminating the reacting material. This can be known as "developing" the photosensitive material.

FIG. 4b illustrates an example of the photosensitive material 404 after it has been developed after being exposed to light through the photo mask 402. Here, the material 404 proximate to portion P1 of the photo mask 402 retained its thickness $t_a$ because it was not exposed to any light and therefore did not react. The material 404 proximate to portion P2 of the photo mask 402 was eliminated (indicated by $t_b$) because it was exposed to enough light to react all of the material. The material 404 proximate to portion P3 of the photo mask 402 reduced its thickness to $t_o$ because it was exposed to sufficient light to partially react.

Figure 5:
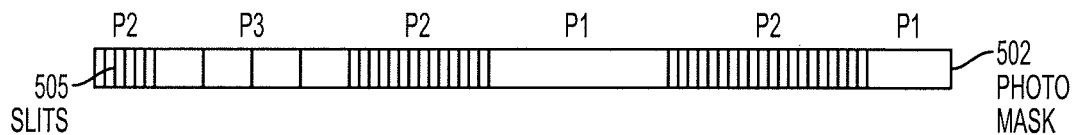
FIG. 5 illustrates another exemplary photo mask that can be used for patterning of a photosensitive material according to various embodiments.

FIG. 5 illustrates another exemplary photo mask that can be used for patterning of a photosensitive material according to various embodiments. In the example of FIG. 5, photo mask 502 can include portions having various slit densities (also known as a slit mask), rather than various transparencies as in FIG. 4a. In this example, portion P1 can have no slits, allowing no light to penetrate the portion. Portion P2 can have a high slit density, allowing substantial light to penetrate the portion. Portion P3 can have a sparser slit density, allowing moderate light to penetrate the portion. The photo mask 502 can affect a photosensitive material similarly as described above.

Figure 6A:
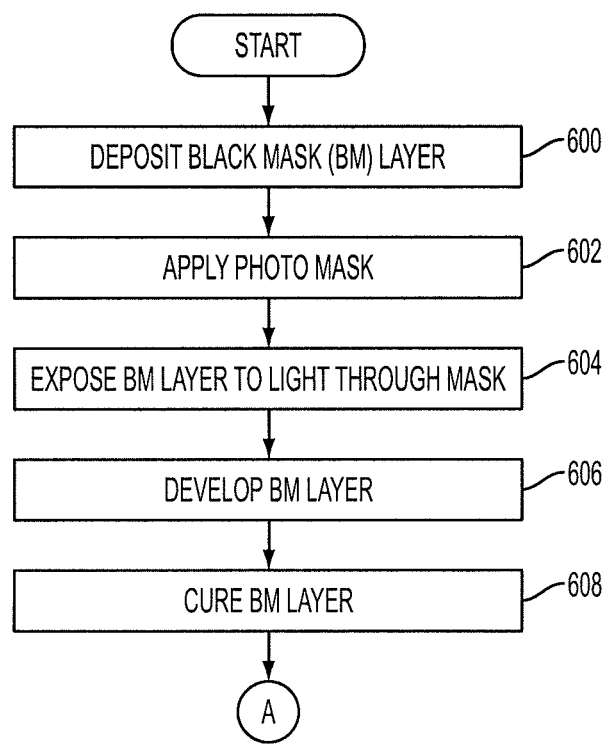
FIGS. 6a-6c illustrate an exemplary method for simplified patterning of thin film layers of a touch sensor panel according to various embodiments.
Figure 6B:
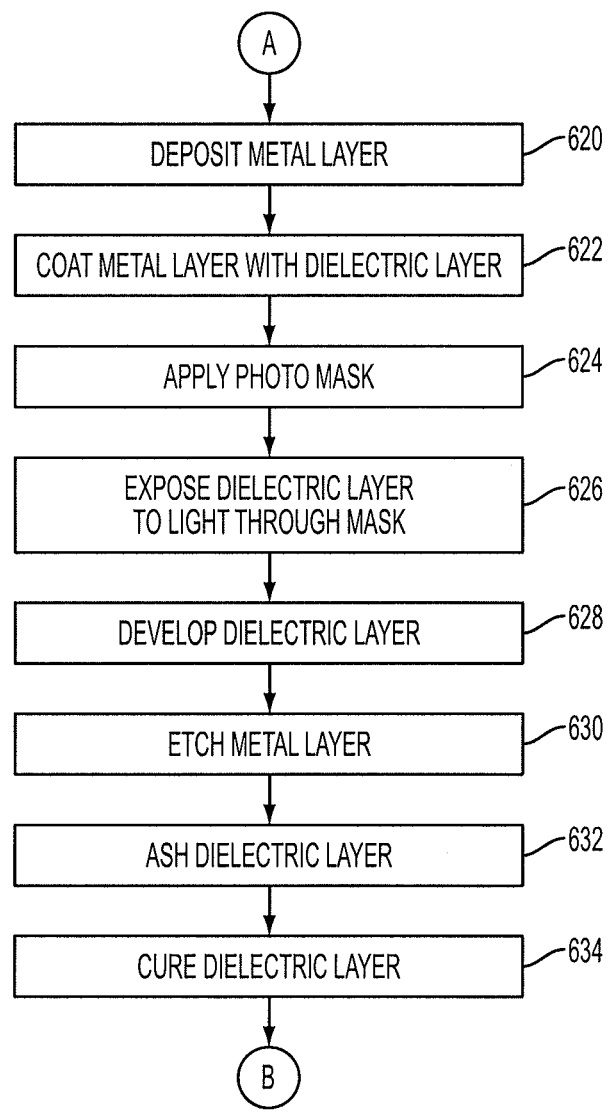
Figure 6C:
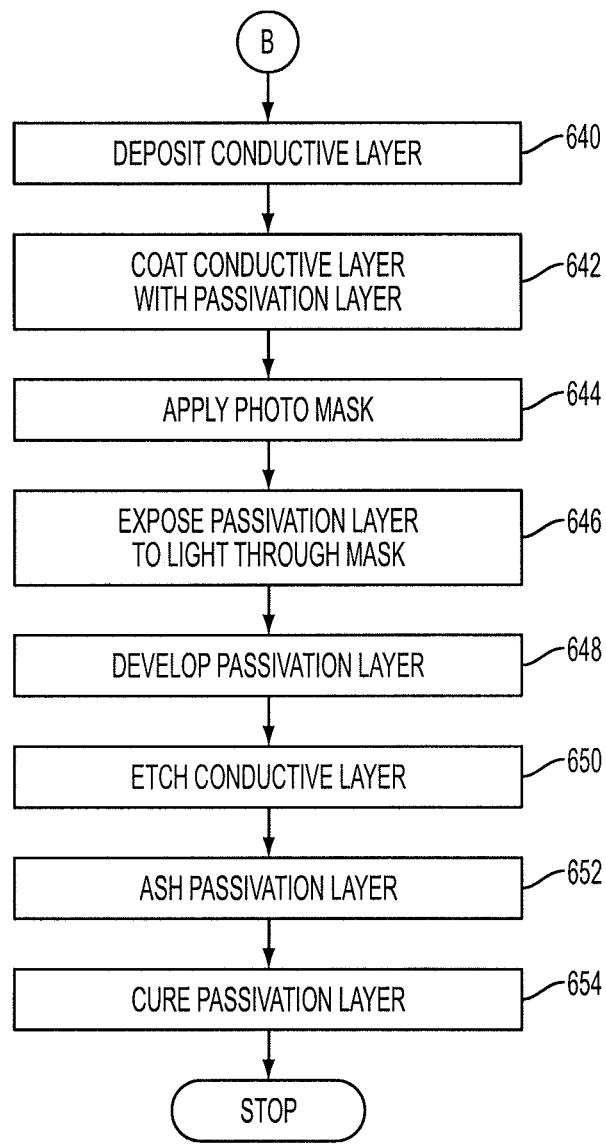

FIGS. 6a-6c illustrate an exemplary method for simplified patterning of thin film layers of a touch sensor panel according to various embodiments. This method can be used to form the conductive bridge of FIGS. 2a-2k and the bonding area of FIGS. 3a-3g. In the example of FIG. 6a, a black mask (BM) layer can be deposited onto a base substrate (600). A removable photo mask can be applied to the black mask layer, where the photo mask can include the desired pattern for the black mask (602). The black mask layer can be exposed to light through the photo mask (604). The black mask layer can be developed to have the desired pattern (606). The patterned black mask layer can be cured (608).

In the example of FIG. 6b, a metal layer can be deposited onto the patterned black mask (620). The metal layer can be coated with a dielectric layer (622). A removable photo mask can be applied to the dielectric layer, where the photo mask can include the desired pattern for metal layer (624). The dielectric layer can be exposed to light through the photo mask (626). The dielectric layer can be developed to have the desired pattern (628). The metal layer can be etched using the patterned dielectric layer as its etching mask (630). This eliminates requiring another removable mask for the metal layer as in the conventional process, thereby simplifying the patterning. The dielectric layer can be ashed to remove any excess portions (632). The dielectric layer can be cured to soften and flow over the metal layer according to a desired profile (634).

In the example of FIG. 6c, a conductive layer can be deposited over the dielectric layer (640). The conductive layer can be coated with a passivation layer (642). A removable photo mask can be applied over the passivation layer, where the photo mask can include the desired pattern for the conductive layer (644). The passivation layer can be exposed to light through the photo mask (646). The passivation layer can be developed to have the desired pattern (648). The conductive layer can be etched using the patterned passivation layer as its etching mask (650). This eliminates requiring an additional removable mask for the conductive layer as in the conventional process, thereby further simplifying the patterning. Excess portions of the passivation layer can be removed by ashing (652). In the case of the bonding area or other conductive traces that should be exposed, all of the passivation layer can be removed from the conductive layer. In the case of the conductive bridge or other conductive traces that should be protected, some or none of the passivation layer can be removed from the conductive layer. The remaining portions of the passivation layer can be cured (654).

It is to be understood that the method is not limited to that described in FIGS. 6a-6c, but can include other or additional actions for simplified patterning of thin film layers. In some embodiments, the black mask layer can be omitted, such that the method can include the actions of FIGS. 6b-6c.

Figure 7A:
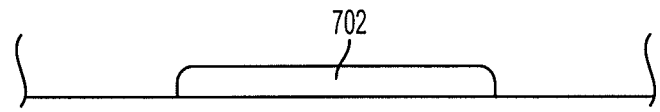
FIGS. 7a-7j illustrate a second exemplary conductive bridge formed by simplified patterning of thin film layers according to various embodiments.
Figure 7B:
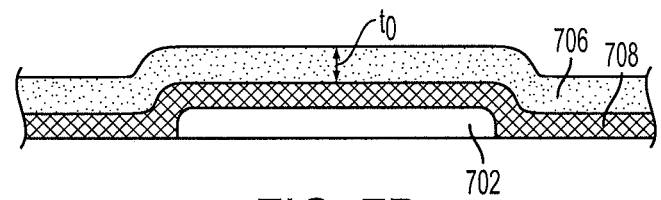
Figure 7C:
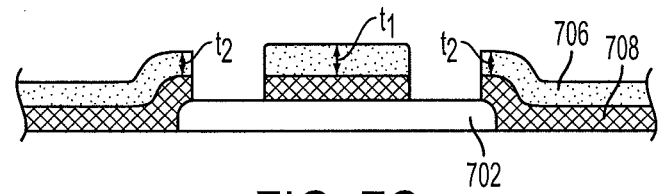
Figure 7D:
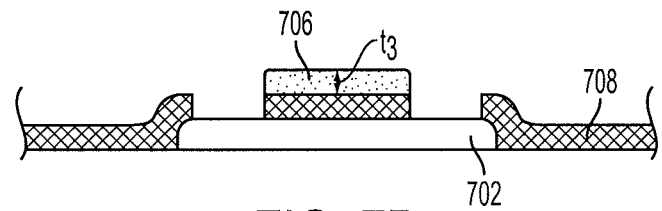
Figure 7E:
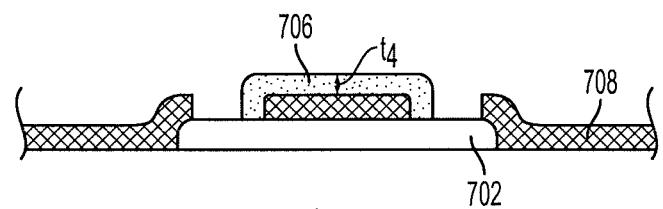

FIGS. 7a-7j illustrate an exemplary conductive bridge of a touch sensor panel formed by simplified patterning of thin film layers according to various embodiments. In the example of FIG. 7a, black mask layer 702 can be patterned onto a thin film substrate. The black mask layer 702 can be patterned, for example, by coating the thin film substrate with a black mask material, applying a removable photo mask, as in FIGS. 4a-4b and 5, to the black mask material, exposing the applied photo mask to light, and developing the black mask material into the pattern of the applied photo mask. In the example of FIG. 7b, conductive layer 708 can be deposited on the patterned black mask layer 702 and dielectric layer 706 can coat the conductive layer. The dielectric layer 706 can have thickness $t_o$. In the example of FIG. 7c, the dielectric layer 706 can be patterned on the conductive layer 708 to have first thickness $t_1$ near the center portion of the pattern and second thickness $t_2$ near the edge portions of the pattern, where $t_o>t_1>t_2$. The dielectric layer 706 can also be patterned to eliminate some portions around the center portion. Then the conductive layer 708 can be etched to form left and right portions that can be a row trace and a center portion that can be a column trace. Here, rather than using a removable photo mask as in the conventional process, the patterned dielectric layer 706 can function as an etching mask for the underlying conductive layer 708, resulting in a simplified patterning. As shown, the portions of the conductive layer 708 having had the dielectric layer 706 removed were the portions of the conductive layer that were etched away. In the example of FIG. 7d, the $t_2$-thickness portions of the dielectric layer 706 can be removed and the $t_1$-thickness portion can be reduced to thickness $t_3$, where $t_1>t_3>t_2$. This can be done, for example, by ashing the dielectric layer 706 using oxygen plasma. In the example of FIG. 7e, the dielectric layer 706 can be cured to thickness $t_4$, where $t_3>t_4$. During curing, the dielectric layer 706 can be heated to a temperature at which the layer becomes soft and flows over the underlying conductive layer 708.

Figure 7F:
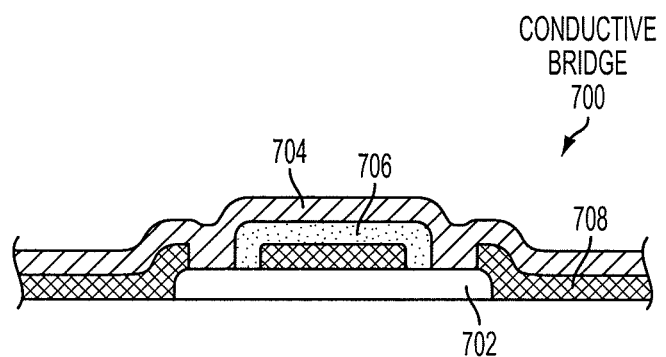
Figure 7G:
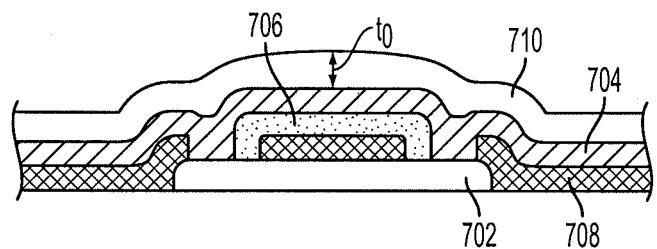
Figure 7H:
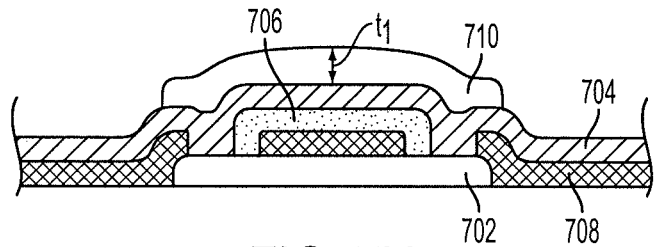
Figure 7I:
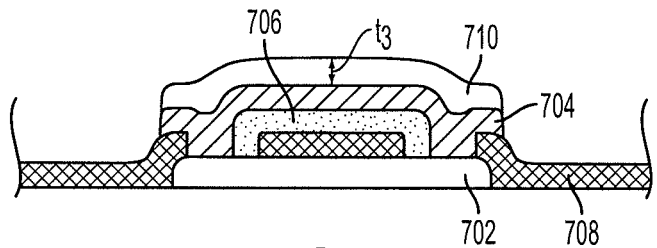
Figure 7J:
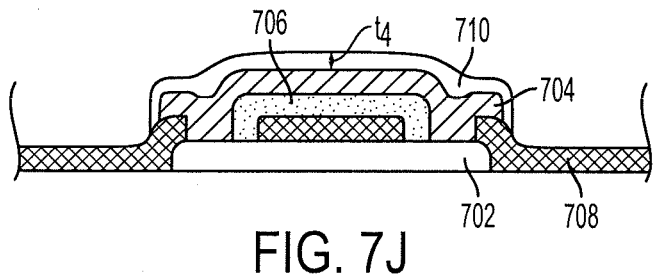

In the example of FIG. 7f, metal layer 704 can be deposited over the cured dielectric layer 706 and the conductive layer 708. In the example of FIG. 7g, passivation layer 710 can coat the metal layer 704. The passivation layer 710 can have thickness $t_o$ and can be a photosensitive material and either organic or inorganic. In the example of FIG. 7h, the passivation layer 710 can be developed into a pattern having portions of the layer removed to form a center portion having thickness $t_1$, where $t_o>t_1$. The passivation layer 710 can be patterned by, for example, exposing an applied photo mask to light and developing the passivation layer into the pattern of the applied photo mask. In the example of FIG. 7i, the metal layer 704 can be etched to form a center portion below the patterned passivation layer 710 that can connect to the left and right portions of the conductive layer 708. Here, rather than using a removable photo mask as in the conventional process, the patterned passivation layer 710 can function as the etching mask for the metal layer 704, resulting in a simplified patterning. Excess portions of the passivation layer 710 can be removed, e.g., by ashing using oxygen plasma, reducing the thickness of the layer to $t_3$, where $t_1>t_3$. In the example of FIG. 7j, the remaining passivation layer 710 can be cured to thickness $t_4$, where $t_3>t_4$. During curing, the passivation layer 710 can be heated to a temperature at which the layer becomes soft and flows over the underlying metal layer 704. The resulting conductive bridge 700 can transmit electrical signals of a touch sensor panel, as described previously.

Figure 8A:
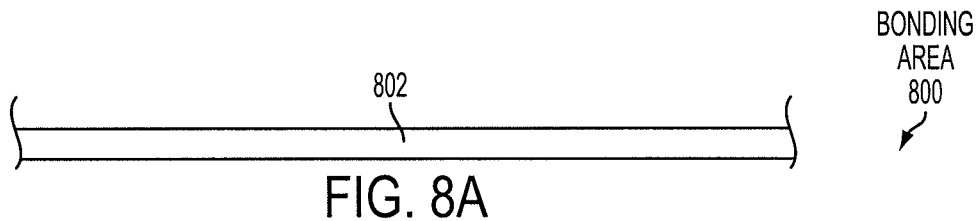
FIGS. 8a-8f illustrate a second exemplary bonding area formed by simplified patterning of thin film layers according to various embodiments.
Figure 8B:
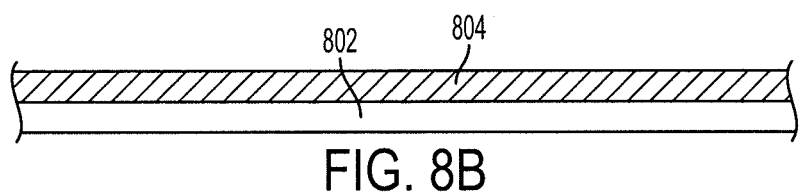
Figure 8C:
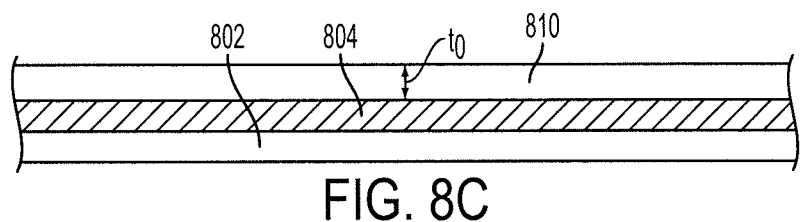
Figure 8D:
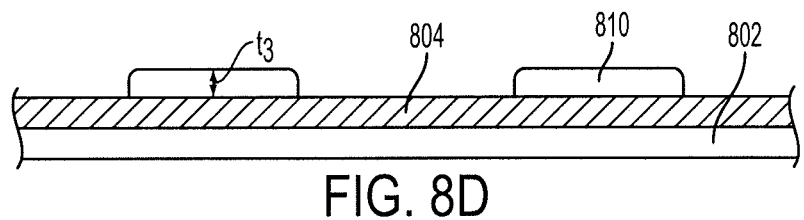
Figure 8E:
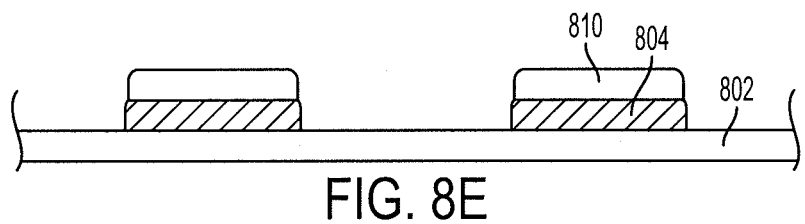
Figure 8F:
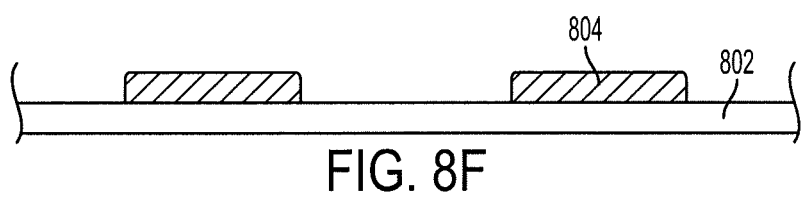

FIGS. 8a-8f illustrate an exemplary bonding area of a touch sensor panel formed by simplified patterning of thin film layers according to various embodiments. In the example of FIG. 8a, black mask layer 802 can be deposited on a thin film substrate. In the example of FIG. 8b, metal layer 804 can be deposited onto the black mask layer 802. In the example of FIG. 8c, passivation layer 810 can be deposited on the metal layer 804 and can have thickness $t_o$. In the example of 8d, the passivation layer 810 can be developed into a pattern having separate portions with thickness $t_3$, where $t_o > t_3$. The passivation layer 810 can be patterned, for example, by exposing an applied photo mask to light and developing the passivation layer into the pattern of the applied photo mask. In the example of FIG. 8e, the metal layer 804 can be etched to form a pattern for bonding conductive traces. Here, rather than using a removable photo mask as in the conventional process, the patterned passivation layer 810 can function as the etching mask for the metal layer 804, resulting in a simplified patterning. In the example of FIG. 8f, the remaining passivation layer 810 can be removed, e.g., by ashing, such that the metal layer 804 can be exposed for bonding with other circuitry.

The simplified patterning of FIGS. 7a-7j and 8a-8f can be performed concurrently. The black mask layers 702, 802 can be deposited onto the thin film substrate as in FIGS. 7a and 8a. The conductive layer 708 and the dielectric layer 706 can be deposited and patterned as in FIGS. 7b-7e. The metal layers 704, 804 can be deposited as in FIGS. 7f and 8b. The passivation layers 710, 810 can be deposited with thickness $t_o$ as in FIGS. 7g and 8c. The passivation layers 710, 810 can be patterned as in FIGS. 7h and 8d. The metal layers 704, 804 can be etched as in FIGS. 7i and 8e. Excess portions of the passivation layer 710, 810 can be removed as in FIGS. 7i-7j and 8f. In this simplified patterning, the number of removable photo masks could be reduced from at least five, as in the conventional process, to no more than three (e.g., for black mask, dielectric, and passivation layer patterning).

It is to be understood that patterning is not limited to that illustrated here, but can include other and/or additional components according to various embodiments.

It is further to be understood that the black mask layers 702, 802 can be optional. As such, the conductive bridge and the bonding area can be formed, beginning with a metal layer deposited on a thin film substrate.

Figure 9A:
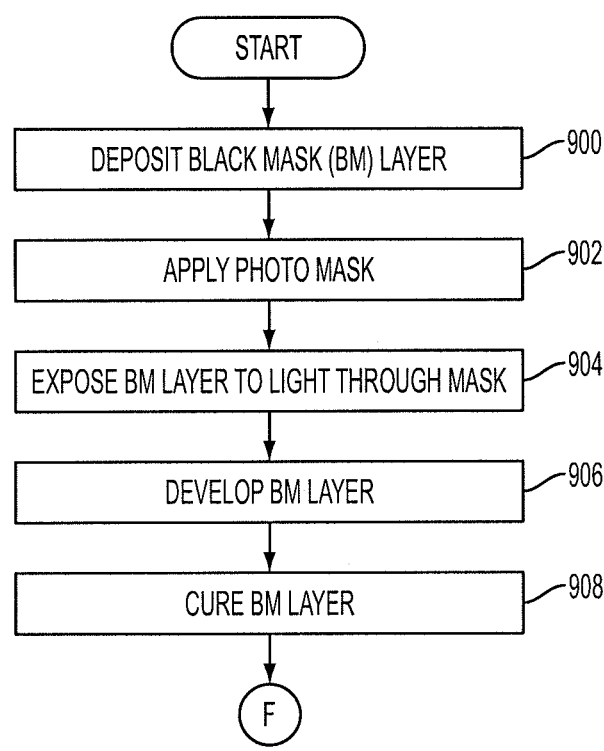
FIGS. 9a-9c illustrate a second exemplary method for simplified patterning of thin film layers of a touch sensor panel according to various embodiments.
Figure 9B:
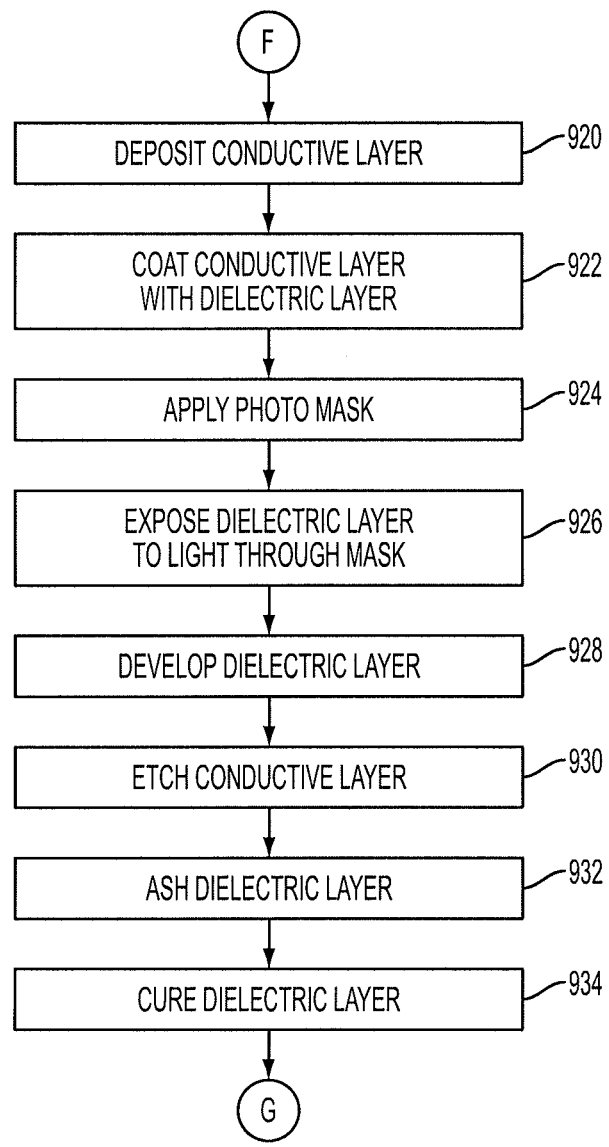
Figure 9C:
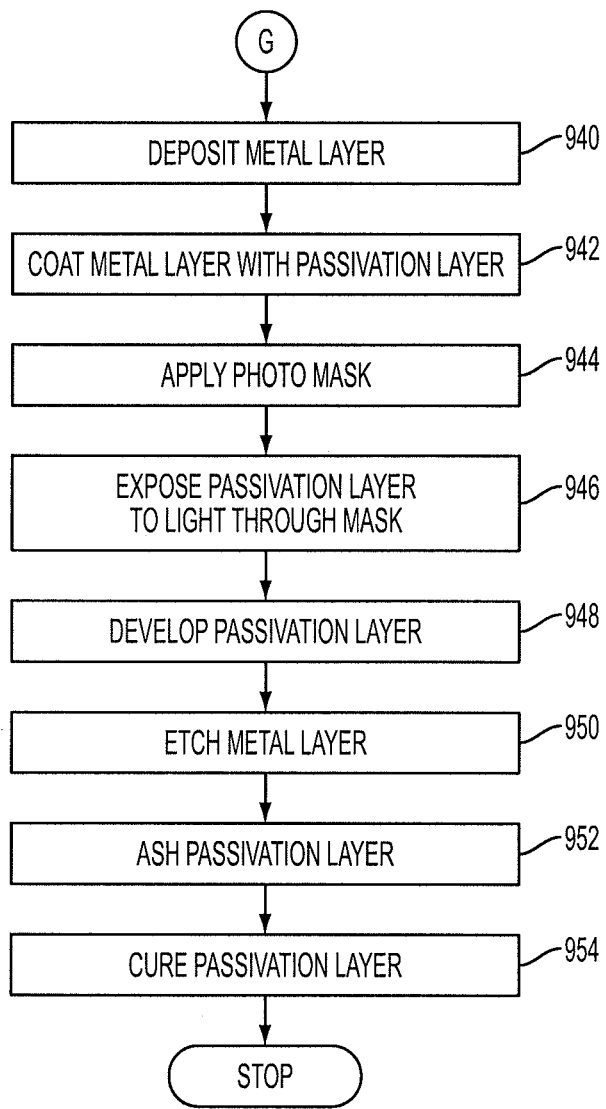

FIGS. 9a-9c illustrate an exemplary method for simplified patterning of thin film layers of a touch sensor panel according to various embodiments. This method can be used to form the conductive bridge of FIGS. 7a-7j and the bonding area of FIGS. 8a-8f. In the example of FIG. 9a, a black mask (BM) layer can be deposited onto a base substrate (900). A removable photo mask can be applied to the black mask layer, where the photo mask can include the desired pattern for the black mask (902). The black mask layer can be exposed to light through the photo mask (904). The black mask layer can be developed to have the desired pattern (906). The patterned black mask layer can be cured (908).

In the example of FIG. 9b, a conductive layer can be deposited onto the patterned black mask (920). The conductive layer can be coated with a dielectric layer (922). A removable photo mask can be applied to the dielectric layer, where the photo mask can include the desired pattern for the conductive layer (924). The dielectric layer can be exposed to light through the photo mask (926). The dielectric layer can be developed to have the desired pattern (928). The conductive layer can be etched using the patterned dielectric layer as its etching mask (930). This eliminates requiring another removable mask for the conductive layer as in the conventional process, thereby simplifying the patterning. The dielectric layer can be ashed to remove any excess portions (932). The dielectric layer can be cured to soften and flow over the conductive layer according to a desired profile (934).

In the example of FIG. 9c, a metal layer can be deposited over the dielectric layer and the conductive layer (940). The metal layer can be coated with a passivation layer (942). A removable photo mask can be applied over the passivation layer, where the photo mask can include the desired pattern for the metal layer (944). The passivation layer can be exposed to light through the photo mask (946). The passivation layer can be developed to have the desired pattern (948). The metal layer can be etched using the patterned passivation layer as its etching mask (950). This eliminates requiring an additional removable mask for the metal layer as in the conventional process, thereby further simplifying the patterning. Excess portions of the passivation layer can be removed by ashing (952). In the case of the bonding area or other conductive traces that should be exposed, all of the passivation layer can be removed from the metal layer. In the case of the conductive bridge or other conductive traces that should be protected, some or none of the passivation layer can be removed from the conductive layer. The remaining portions of the passivation layer can be cured (954).

It is to be understood that the method is not limited to that described in FIGS. 9a-9c, but can include other or additional actions for simplified patterning of thin film layers. In some embodiments, the black mask layer can be omitted, such that the method can include the actions of FIGS. 9b-9c.

Figure 10A:
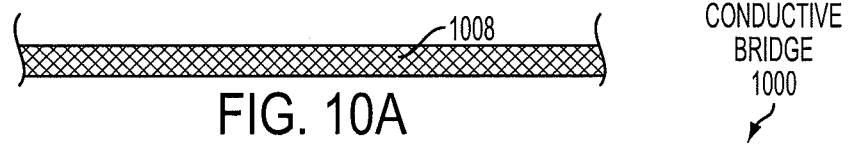
FIGS. 10a-10j illustrate a third exemplary conductive bridge formed by simplified patterning of thin film layers according to various embodiments.
Figure 10B:
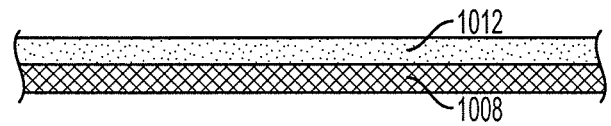
Figure 10C:
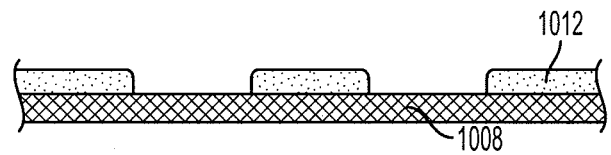
Figure 10D:
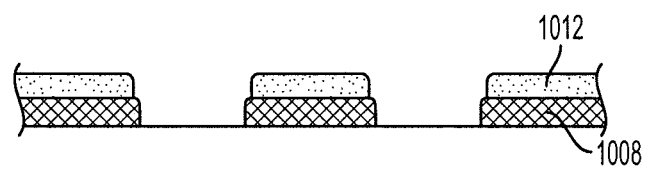
Figure 10E:
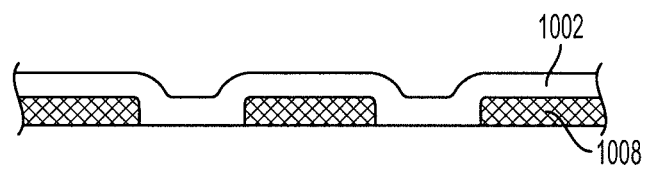
Figure 10F:
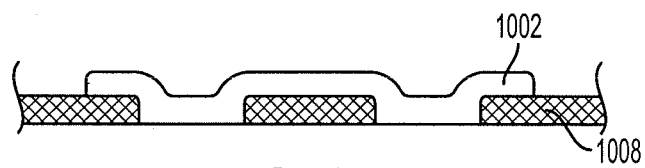

FIGS. 10a-10j illustrate an exemplary conductive bridge of a touch sensor panel formed by simplified patterning of thin film layers according to various embodiments. In the example of FIG. 10a, conductive layer 1008 can be deposited onto a thin film substrate. In the example of FIG. 10b, the conductive layer 1008 can be coated with photosensitive (or photoresist) layer 1012. In the example of FIG. 10c, the photosensitive layer 1012 can be patterned to have a desired pattern of the conductive layer 1008. The photosensitive layer 1012 can be patterned, for example, by applying a removable photo mask, as in FIGS. 4a-4b and 5, to the layer, exposing the applied photo mask to light, and developing the photosensitive layer into the pattern of the mask. In the example of FIG. 10d, the conductive layer 1008 can be etched to form left and right portions that can be a row trace and a center portion that can be a column trace. Here, rather than using a removable photo mask as in the conventional process, the patterned photosensitive layer 1012 can function as an etching mask for the underlying conductive layer 1008, resulting in a simplified patterning. As shown, the portions of the conductive layer 1008 having had the photosensitive layer 1012 removed were the portions of the conductive layer that were etched away. The remaining photosensitive layer 1012 can be removed from the conductive layer 1008, for example, by chemical stripping. In the example of FIG. 10e, black mask layer 1002 can be deposited on the patterned conductive layer 1008. In the example of FIG. 10f, the black mask layer 1002 can be patterned. The black mask layer 1002 can be patterned, for example, by applying a removable photo mask, as in FIGS. 4a-4b and 5, to the black mask material, exposing the applied photo mask to light, and developing the black mask material into the pattern of the applied photo mask. The patterned black mask layer 1002 can be cured.

Figure 10G:
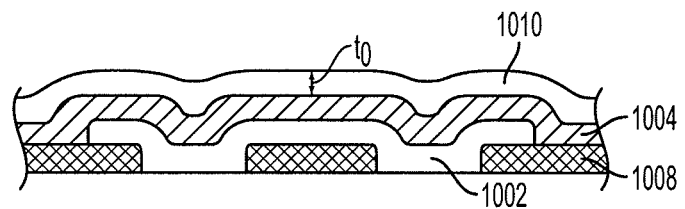
Figure 10H:
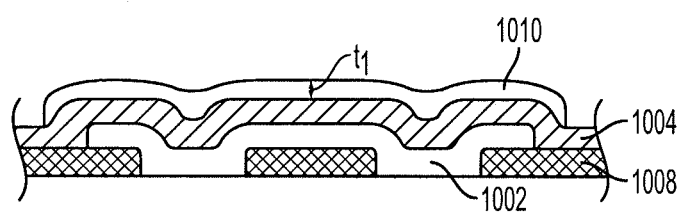
Figure 10I:
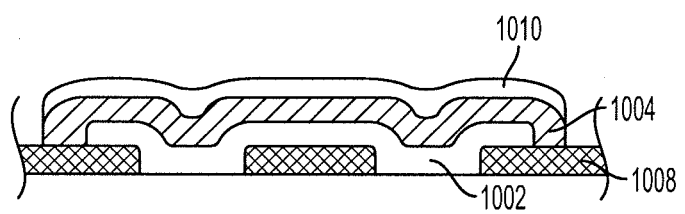
Figure 10J:
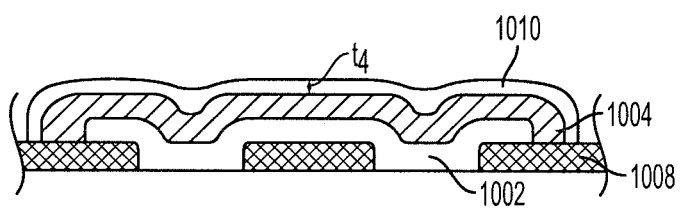

In the example of FIG. 10g, metal layer 1004 can be deposited on the patterned black mask layer 1002 and passivation layer 1010 can coat the metal layer. The passivation layer 1010 can have thickness $t_o$. In the example of FIG. 10h, the passivation layer 1010 can be patterned on the metal layer 1004 to have thickness $t_1$, where $t_o > t_1$. The passivation layer 1010 can be patterned by, for example, exposing an applied photo mask to light and developing the passivation layer into the pattern of the applied photo mask. In the example of FIG. 10i, the metal layer 1004 can be etched to form a center portion below the patterned passivation layer 1010 that can connect to the left and right portions of the conductive layer 1008. Here, rather than using a removable photo mask as in the conventional process, the patterned passivation layer 1010 can function as the etching mask for the metal layer 1004, resulting in a simplified patterning. In the example of FIG. 10*j*, the passivation layer 1010 can be cured to thickness $t_4$, where $t_1 > t_4$. During curing, the passivation layer 1010 can be heated to a temperature at which the layer becomes soft and flows over the underlying metal layer 1004. The resulting conductive bridge 1000 can transmit electrical signals of a touch sensor panel, as described previously.

Figure 11A:
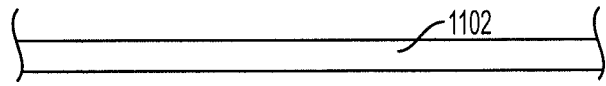
FIGS. 11a-11f illustrate a third exemplary bonding area formed by simplified patterning of thin film layers according to various embodiments.
Figure 11B:
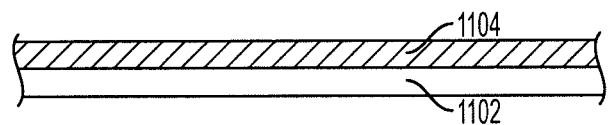
Figure 11C:
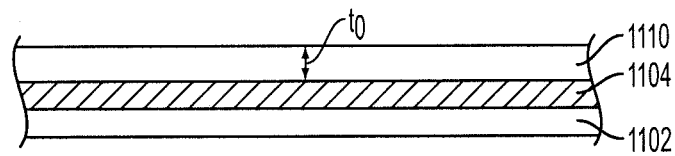
Figure 11D:
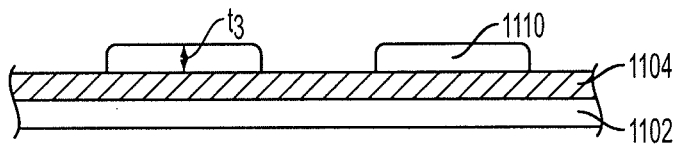
Figure 11E:
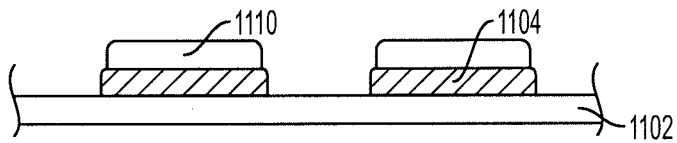
Figure 11F:
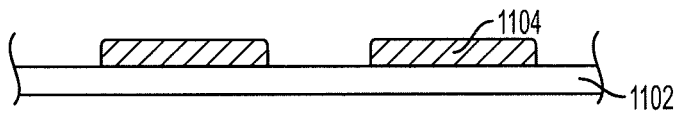

FIGS. 11*a*-11*f* illustrate an exemplary bonding area of a touch sensor panel formed by simplified patterning of thin film layers according to various embodiments. In the example of FIG. 11*a*, black mask layer 1102 can be deposited on a thin film substrate. In the example of FIG. 11*b*, metal layer 1104 can be deposited onto the black mask layer 1102. In the example of FIG. 11*c*, passivation layer 1110 can be deposited on the metal layer 1104 and can have thickness $t_o$. In the example of 11*d*, the passivation layer 1110 can be developed into a pattern having separate portions with thickness $t_3$, where $t_o > t_3$. The passivation layer 1110 can be patterned, for example, by exposing an applied photo mask to light and developing the passivation layer into the pattern of the applied photo mask. In the example of FIG. 11*e*, the metal layer 1104 can be etched to form a pattern for bonding conductive traces. Here, rather than using a removable photo mask as in the conventional process, the patterned passivation layer 1110 can function as the etching mask for the metal layer 1104, resulting in a simplified patterning. In the example of FIG. 11*f*, the remaining passivation layer 1110 can be removed, e.g., by ashing, such that the metal layer 1104 can be exposed for bonding with other circuitry.

The simplified patterning of FIGS. 10*a*-10*j* and 11*a*-11*f* can be performed concurrently. The conductive layer 1008 and the photosensitive layer 1012 can be deposited and patterned onto the thin film substrate as in FIGS. 10*a*-10*d*. The black mask layers 1002, 1102 can be deposited as in FIGS. 10*e* and 11*a*. The black mask layer 1002 can be patterned as in FIG. 10*f*. The metal layers 1004, 1104 can be deposited and the passivation layers 1010, 1110 can be deposited with thickness $t_o$ as in FIGS. 10*g* and 11*b*-11*c*. The passivation layers 1010, 1110 can be patterned as in FIGS. 10*h* and 11*d*. The metal layers 1004, 1104 can be etched as in FIGS. 10*i* and 11*e*. The passivation layer 1110 can be removed from the bonding areas as in FIG. 11*f*. The passivation layer 1010 on the conductive bridge can be cured as in FIG. 10*j*. In this simplified patterning, the number of removable photo masks could be reduced from at least five, as in the conventional process, to no more than three (e.g., for photosensitive, black mask, and passivation layer patterning).

It is to be understood that patterning is not limited to that illustrated here, but can include other and/or additional components according to various embodiments. In some embodiments, the black mask layer can be replaced by a dielectric layer. In some embodiments, a combination black mask and dielectric layer can be used.

Figure 12A:
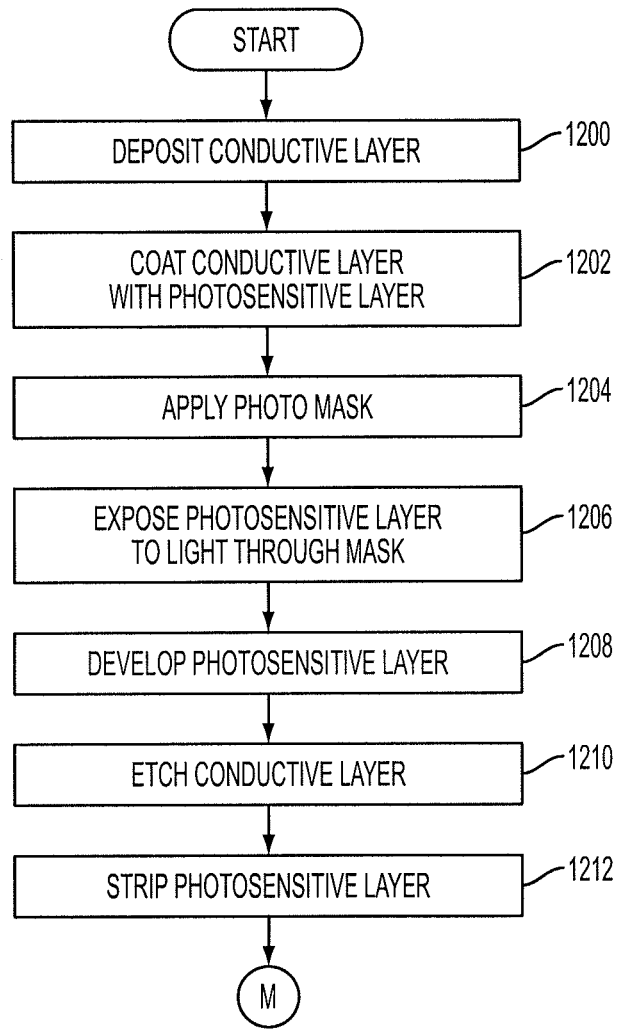
FIGS. 12a-12c illustrate a third exemplary method for simplified patterning of thin film layers of a touch sensor panel according to various embodiments.
Figure 12B:
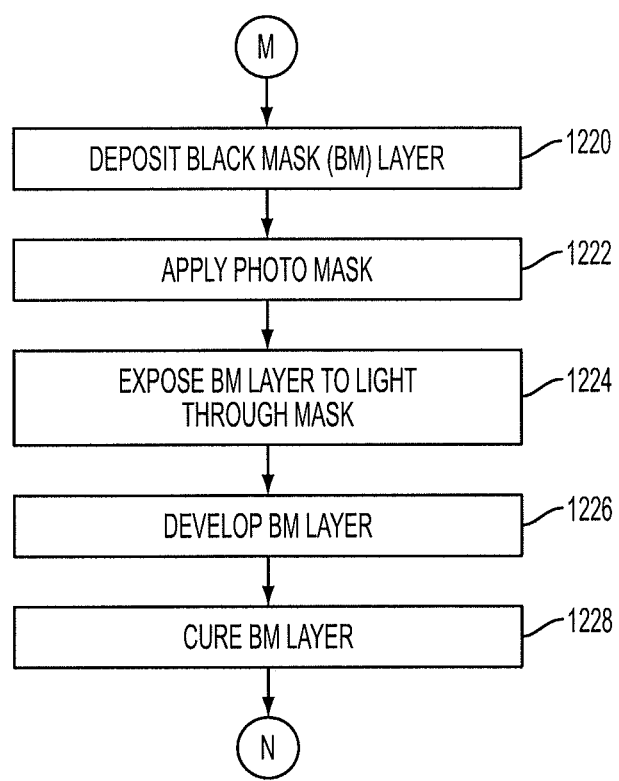
Figure 12C:
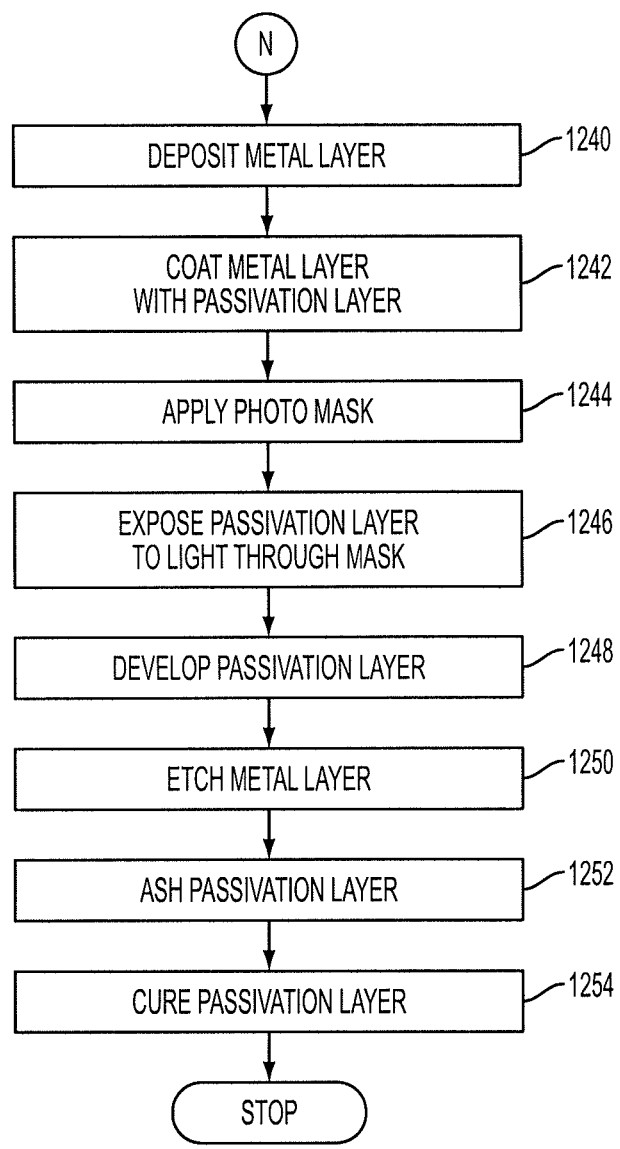

FIGS. 12*a*-12*c* illustrate an exemplary method for simplified patterning of thin film layers of a touch sensor panel according to various embodiments. This method can be used to form the conductive bridge of FIGS. 10*a*-10*j* and the bonding area of FIGS. 11*a*-11*f*. In the example of FIG. 12*a*, a conductive layer can be deposited onto a base substrate (1200). The conductive layer can be coated with a photosensitive (or photoresist) layer (1202). A removable photo mask can be applied to the photosensitive layer, where the photo mask can include the desired pattern for the conductive layer (1204). The photosensitive layer can be exposed to light through the photo mask (1206). The photosensitive layer can be developed to have the desired pattern (1208). The conductive layer can be etched using the patterned photosensitive layer as its etching mask (1210). This eliminates the need for another removable mask for the conductive layer as in the conventional process, thereby simplifying the patterning. The photosensitive layer can be chemically stripped to remove it from the patterned conductive layer (1212).

In the example of FIG. 12*b*, a black mask (BM) layer can be deposited onto the patterned conductive layer (1220). A removable photo mask can be applied to the black mask layer, where the photo mask can include the desired pattern for the black mask (1222). The black mask layer can be exposed to light through the photo mask (1224). The black mask layer can be developed to have the desired pattern (1226). The patterned black mask layer can be cured (1228).

In the example of FIG. 12*c*, a metal layer can be deposited over the black mask layer and the conductive layer (1240). The metal layer can be coated with a passivation layer (1242). A removable photo mask can be applied over the passivation layer, where the photo mask can include the desired pattern for the metal layer (1244). The passivation layer can be exposed to light through the photo mask (1246). The passivation layer can be developed to have the desired pattern (1248). The metal layer can be etched using the patterned passivation layer as its etching mask (1250). This eliminates the need for an additional removable mask for the metal layer as in the conventional process, thereby further simplifying the patterning. Excess portions of the passivation layer can be removed by ashing (1252). In the case of the bonding area or other conductive traces that should be exposed, all of the passivation layer can be removed from the metal layer. In the case of the conductive bridge or other conductive traces that should be protected, some or none of the passivation layer can be removed from the conductive layer. The remaining portions of the passivation layer can be cured (1254).

It is to be understood that the method is not limited to that described in FIGS. 12*a*-12*c*, but can include other or additional actions for simplified patterning of thin film layers.

Figure 13A:
FIGS. 13a-13i illustrate a fourth exemplary conductive bridge formed by simplified patterning of thin film layers according to various embodiments.
Figure 13B:
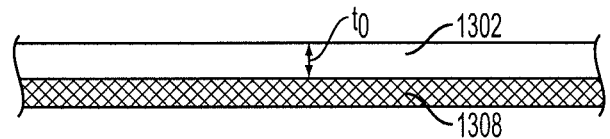
Figure 13C:
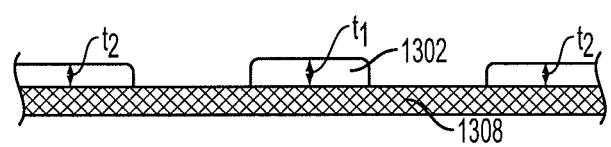
Figure 13D:
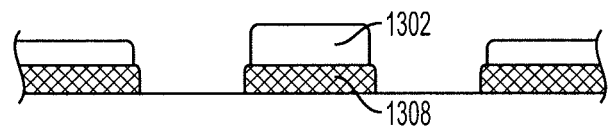
Figure 13E:
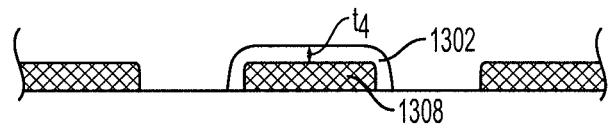

FIGS. 13*a*-13*i* illustrate an exemplary conductive bridge of a touch sensor panel formed by simplified patterning of thin film layers according to various embodiments. In the example of FIG. 13*a*, conductive layer 1308 can be deposited onto a thin film substrate. In the example of FIG. 13*b*, the conductive layer 1308 can be coated with black mask (BM) layer 1302 having thickness $t_o$. In the example of FIG. 13*c*, the black mask layer 1302 can be patterned to have a desired pattern of the conductive layer 1308, where the black mask layer can have portions removed to form a center portion having first thickness $t_1$ and left and right portions having second thickness $t_2$ proximate to the center portion, where $t_o > t_1 > t_2$. The black mask layer 1302 can be patterned, for example, by applying a removable photo mask, as in FIGS. 4*a*-4*b* and 5, to the layer, exposing the applied photo mask to light, and developing the black mask layer into the pattern of the photo mask. In the example of FIG. 13*d*, the conductive layer 1308 can be etched to form left and right portions that can be a row trace and a center portion that can be a column trace. Here, rather than using a removable photo mask as in the conventional process, the patterned black mask layer 1302 can function as an etching mask for the underlying conductive layer 1308, resulting in a simplified patterning. As shown, the portions of the conductive layer 1308 having had the black mask layer 1302 removed were the portions of the conductive layer that were etched away. In the example of FIG. 13*e*, excess portions of the black mask layer 1302 can be removed, for example, by ashing, resulting in the $t_2$-thickness portions being eliminated and the $t_1$-thickness portion being decreased. The ashed black mask layer 1302 can be cured to thickness $t_4$, where $t_1 > t_4$. During curing, the black mask layer 1302 can be heated to a temperature at which the layer becomes soft and flows over the underlying conductive layer 1008.

Figure 13F:
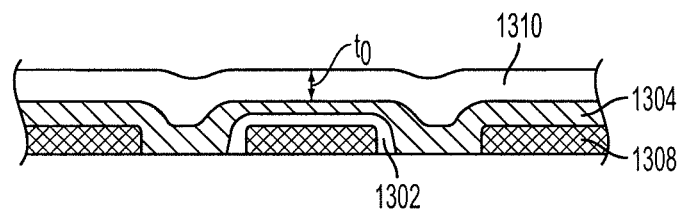
Figure 13G:
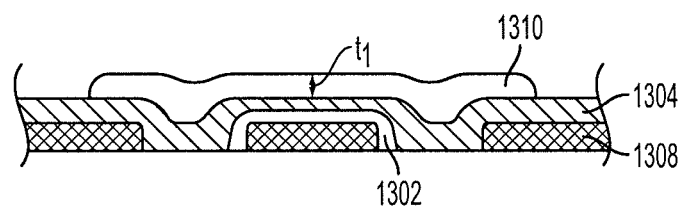
Figure 13H:
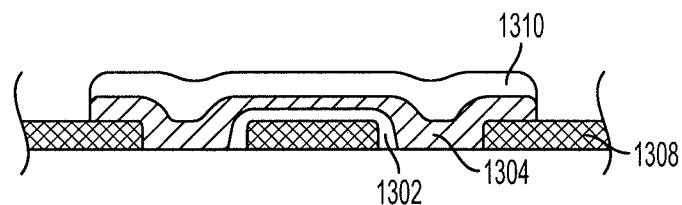
Figure 13I:
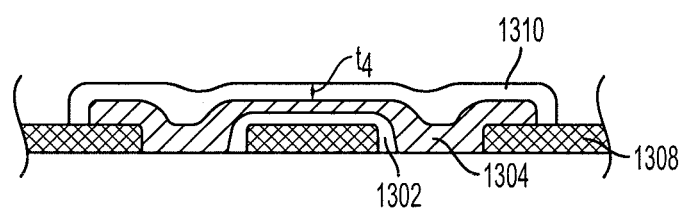

In the example of FIG. 13*f*, metal layer 1304 can be deposited on the patterned black mask layer 1302 and the conductive layer 1308. Passivation layer 1310 can coat the metal layer 1302 with thickness $t_o$. In the example of FIG. 13*g*, the passivation layer 1310 can be patterned on the metal layer 1304 to have thickness $t_1$, where $t_o > t_1$. The passivation layer 1310 can be patterned by, for example, exposing an applied photo mask to light and developing the passivation layer into the pattern of the applied photo mask. In the example of FIG. 13*h*, the metal layer 1304 can be etched to form a center portion below the patterned passivation layer 1310 connecting to the left and right portions of the conductive layer 1308. Here, rather than using a removable photo mask as in the conventional process, the patterned passivation layer 1310 can function as the etching mask for the metal layer 1304, resulting in a simplified patterning. In the example of FIG. 13*i*, the passivation layer 1310 can be cured to thickness $t_4$, where $t_1 > t_4$. During curing, the passivation layer 1310 can be heated to a temperature at which the layer becomes soft and flows over the underlying metal layer 1304. The resulting conductive bridge 1300 can transmit electrical signals of a touch sensor panel, as described previously.

Figure 14A:
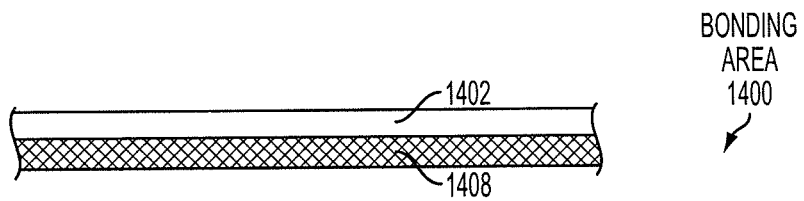
FIGS. 14a-14f illustrate a fourth exemplary bonding area formed by simplified patterning of thin film layers according to various embodiments.
Figure 14B:
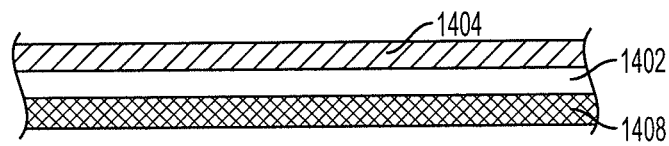
Figure 14C:
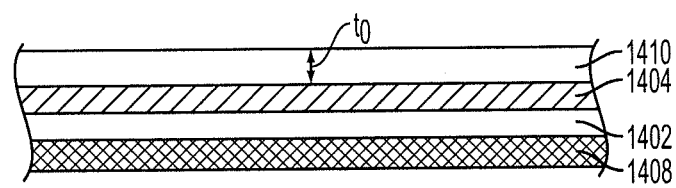
Figure 14D:
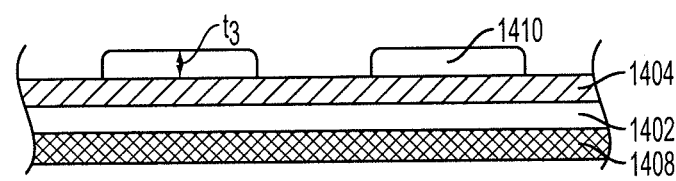
Figure 14E:
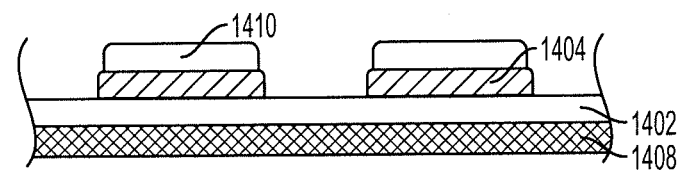
Figure 14F:
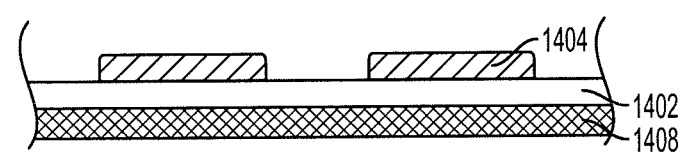

FIGS. 14*a*-14*f* illustrate an exemplary bonding area of a touch sensor panel formed by simplified patterning of thin film layers according to various embodiments. In the example of FIG. 14*a*, conductive layer 1408 and black mask layer 1402 can be deposited on a thin film substrate. In the example of FIG. 14*b*, metal layer 1404 can be deposited onto the black mask layer 1402. In the example of FIG. 14*c*, passivation layer 1410 can be deposited on the metal layer 1404 and can have thickness $t_o$. In the example of 14*d*, the passivation layer 1410 can be developed into a pattern having separate portions with thickness $t_3$, where $t_o > t_3$. The passivation layer 1410 can be patterned, for example, by exposing an applied photo mask to light and developing the passivation layer into the pattern of the applied photo mask. In the example of FIG. 14*e*, the metal layer 1404 can be etched to form a pattern for bonding conductive traces. Here, rather than using a removable photo mask as in the conventional process, the patterned passivation layer 1410 can function as the etching mask for the metal layer 1404, resulting in a simplified patterning. In the example of FIG. 14*f*, the remaining passivation layer 1410 can be removed, e.g., by ashing, such that the metal layer 1404 can be exposed for bonding with other circuitry.

The simplified patterning of FIGS. 13*a*-13*i* and 14*a*-14*f* can be performed concurrently. The conductive layers 1308, 1408 and the black mask layers 1302, 1402 can be deposited onto the thin film substrate as in FIGS. 13*a*-13*b* and 14*a*. The black mask layer 1302 and the conductive layer 1308 can be patterned as in FIGS. 13*c*-13*e*. The metal layers 1304, 1404 can be deposited and the passivation layers 1310, 1410 can be deposited with thickness $t_o$ as in FIGS. 13*f* and 14*b*-14*c*. The passivation layers 1310, 1410 can be patterned as in FIGS. 13*g* and 14*d*. The metal layers 1304, 1404 can be etched as in FIGS. 13*h* and 14*e*. The passivation layer 1410 can be removed from the bonding areas as in FIG. 14*f*. The passivation layer 1310 on the conductive bridge can be cured as in FIG. 13*i*. In this simplified patterning, the number of removable photo masks could be reduced from at least five, as in the conventional process, to no more than two (e.g., for black mask and passivation layer patterning).

It is to be understood that patterning is not limited to that illustrated here, but can include other and/or additional components according to various embodiments. In some embodiments, the black mask layer can be replaced by a dielectric layer. In some embodiments, a combination black mask and dielectric layer can be used.

Figure 15A:
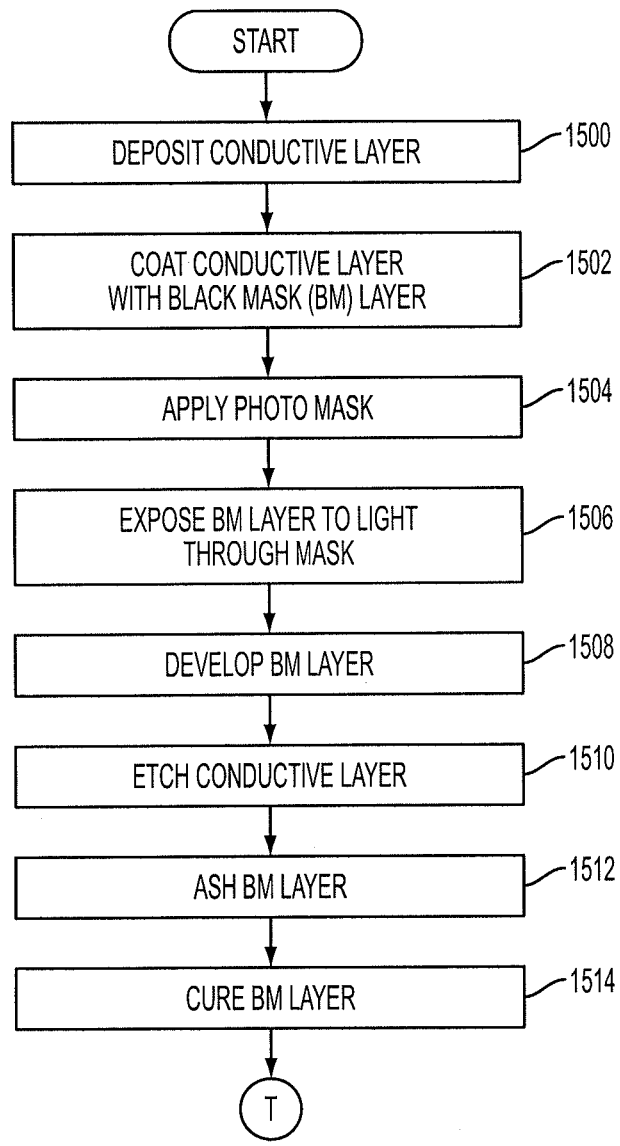
FIGS. 15a-15b illustrate a fourth exemplary method for simplified patterning of thin film layers of a touch sensor panel according to various embodiments.
Figure 15B:
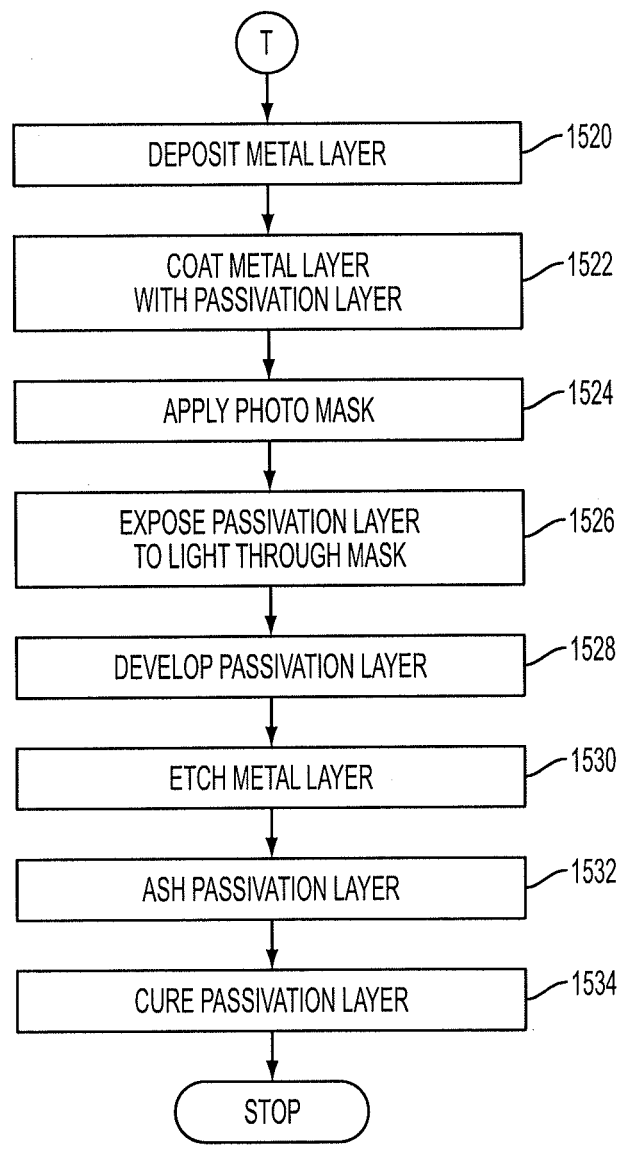

FIGS. 15*a*-15*b* illustrate an exemplary method for simplified patterning of thin film layers of a touch sensor panel according to various embodiments. This method can be used to form the conductive bridge of FIGS. 13*a*-13*i* and the bonding area of FIGS. 14*a*-14*f*. In the example of FIG. 15*a*, a conductive layer can be deposited onto a base substrate (1500). The conductive layer can be coated with a black mask (BM) layer (1502). A removable photo mask can be applied to the black mask layer, where the photo mask can include the desired pattern for the conductive layer (1504). The black mask layer can be exposed to light through the photo mask (1506). The black mask layer can be developed to have the desired pattern (1508). The conductive layer can be etched using the patterned black mask layer as its etching mask (1510). This eliminates requiring another removable mask for the conductive layer as in the conventional process, thereby simplifying the patterning. Excess portions of the black mask layer can be removed, for example, by ashing (1512). The black mask layer can be cured to soften and flow over the underlying conductive layer according to a desired profile (1514).

In the example of FIG. 15*b*, a metal layer can be deposited over the black mask layer and the conductive layer (1520). The metal layer can be coated with a passivation layer (1522). A removable photo mask can be applied over the passivation layer, where the photo mask can include the desired pattern for the metal layer (1524). The passivation layer can be exposed to light through the photo mask (1526). The passivation layer can be developed to have the desired pattern (1528). The metal layer can be etched using the patterned passivation layer as its etching mask (1530). This eliminates requiring an additional removable mask for the metal layer as in the conventional process, thereby further simplifying the patterning. Excess portions of the passivation layer can be removed by ashing (1532). In the case of the bonding area or other conductive traces that should be exposed, all of the passivation layer can be removed from the metal layer. In the case of the conductive bridge or other conductive traces that should be protected, some or none of the passivation layer can be removed from the conductive layer. The remaining portions of the passivation layer can be cured (1534).

It is to be understood that the method is not limited to that described in FIGS. 15*a*-15*b*, but can include other or additional actions for simplified patterning of thin film layers.

Figure 16:
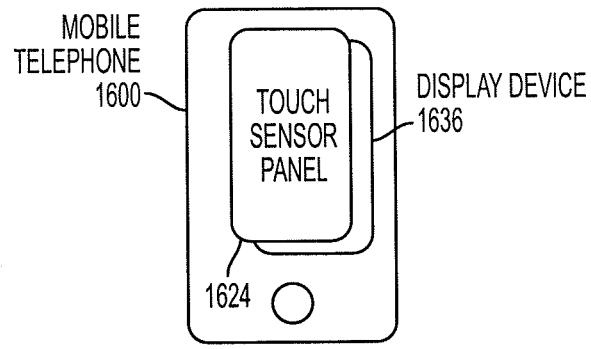
FIG. 16 illustrates an exemplary mobile telephone having a touch sensor panel that includes conductive bridges and bonding areas formed by simplified patterning of thin film layers according to various embodiments.

FIG. 16 illustrates an exemplary mobile telephone 1600 that can include touch sensor panel 1624, display device 1636, and other computing system blocks, where the touch sensor panel can have conductive bridges and bonding areas formed by simplified patterning of thin film lines.

Figure 17:
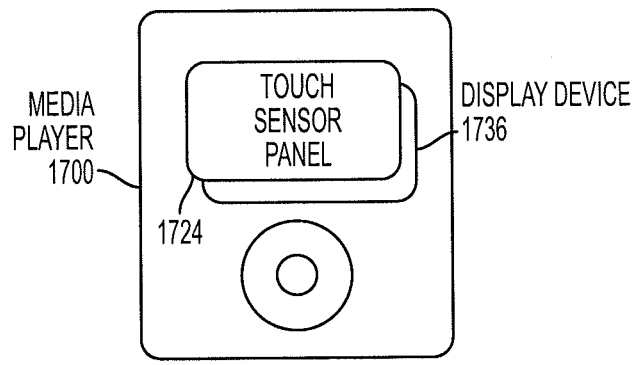
FIG. 17 illustrates an exemplary digital media player having a touch sensor panel that includes conductive bridges and bonding areas formed by simplified patterning of thin film layers according to various embodiments.

FIG. 17 illustrates an exemplary digital media player 1700 that can include touch sensor panel 1724, display device 1736, and other computing system blocks, where the touch sensor panel can have conductive bridges and bonding areas formed by simplified patterning of thin film lines.

Figure 18:
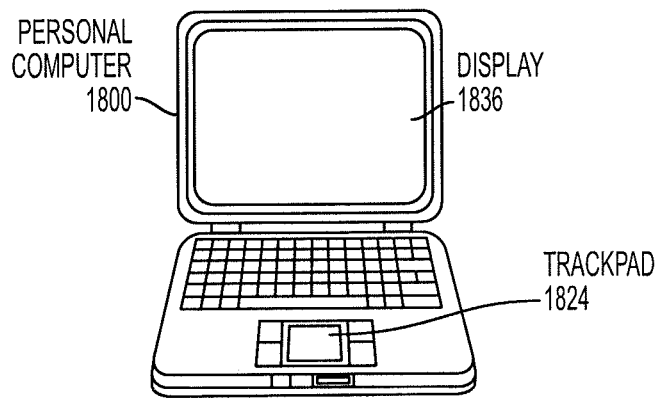
FIG. 18 illustrates an exemplary computer having a touch sensor panel that includes conductive bridges and bonding areas formed by simplified patterning of thin film layers according to various embodiments.

FIG. 18 illustrates an exemplary personal computer 1800 that can include touch sensor panel (trackpad) 1824 and display 1836, and other computing system blocks, where the touch sensor panel can have conductive bridges and bonding areas formed by simplified patterning of thin film lines.

The mobile telephone, media player, and personal computer of FIGS. 16 through 18 can have conductive and passivation layer patterns formed in a simplified manner according to various embodiments, thereby realizing cost, time, and power savings.

Figure 19:
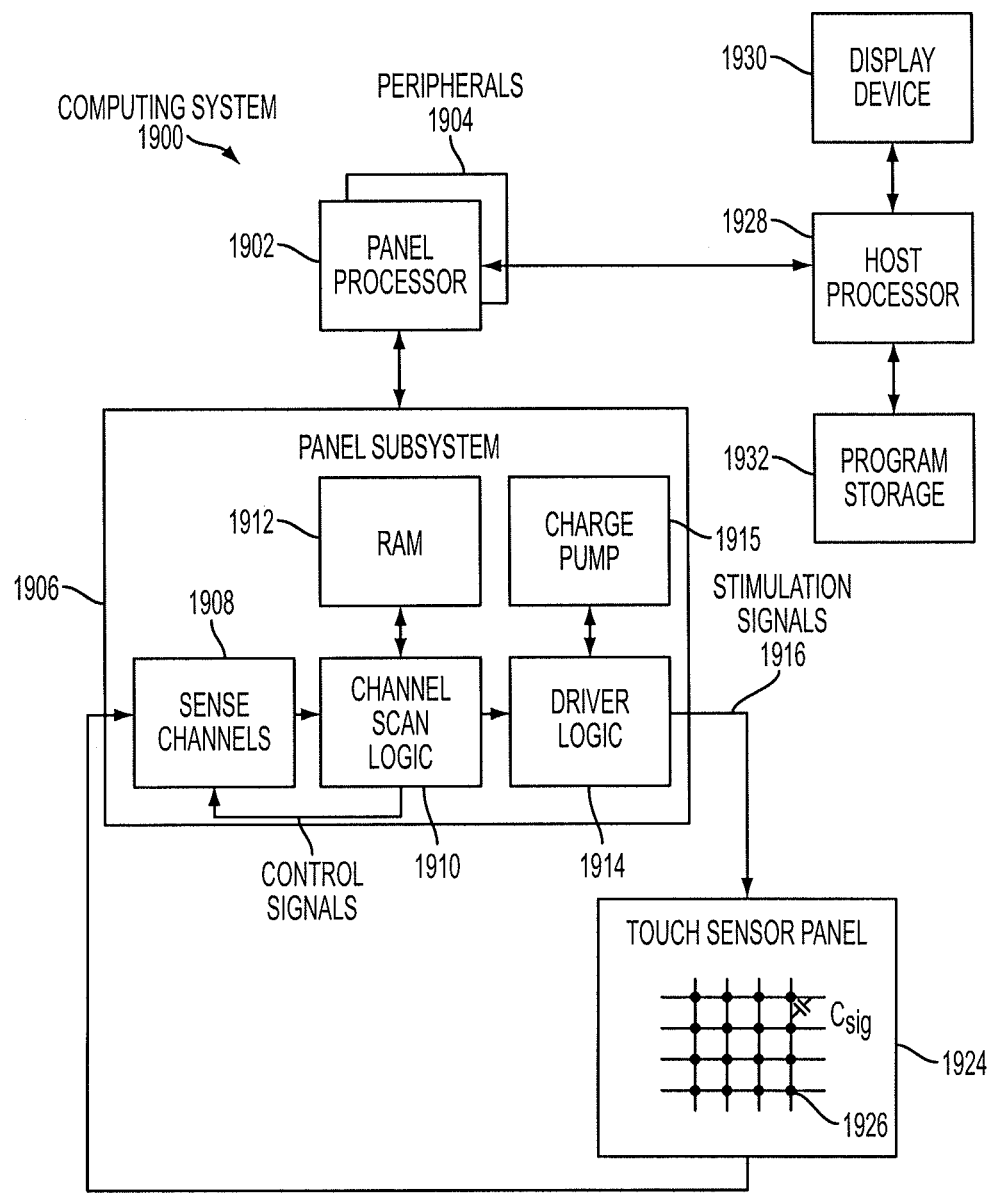
FIG. 19 illustrates an exemplary computing system including a touch sensor panel utilizing conductive bridges and bonding areas thereon formed by simplified patterning of thin film layers according to various embodiments.

FIG. 19 illustrates exemplary computing system 1900 that can include one or more of the embodiments of the invention described above. Computing system 1900 can include one or more panel processors 1902 and peripherals 1904, and panel subsystem 1906. Peripherals 1904 can include, but are not limited to, random access memory (RAM) or other types of memory or storage, watchdog timers and the like. Panel subsystem 1906 can include, but is not limited to, one or more sense channels 1908, channel scan logic 1910 and driver logic 1914. Channel scan logic 1910 can access RAM 1912, autonomously read data from the sense channels and provide control for the sense channels. In addition, channel scan logic 1910 can control driver logic 1914 to generate stimulation signals 1916 at various frequencies and phases that can be selectively applied to drive lines of touch sensor panel 1924. In some embodiments, panel subsystem 1906, panel processor 1902 and peripherals 1904 can be integrated into a single application specific integrated circuit (ASIC).

Touch sensor panel 1924 can include a capacitive sensing medium having multiple drive lines and sense lines, although other sensing media can also be used. The drive and sense lines and conductive bridges at the crossings of the drive and sense lines can be formed using simplified patterning according to various embodiments. Each crossing of the drive and sense lines can represent a capacitive sensing node and can be viewed as picture element (pixel) 1926, which can be particularly useful when touch sensor panel 1924 is viewed as capturing an "image" of touch. (In other words, after panel subsystem 1906 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 1924 can drive sense channel 1908 (also referred to herein as an event detection and demodulation circuit) in panel subsystem 1906.

Computing system 1900 can also include host processor 1928 for receiving outputs from panel processor 1902 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 1928 can also perform additional functions that may not be related to panel processing, and can be coupled to program storage 1932 and display device 1930 such as an LCD panel for providing a UI to a user of the device. Display device 1930 together with touch sensor panel 1924, when located partially or entirely under the touch sensor panel, can form touch screen 1918.

Note that one or more of the functions described above can be performed by firmware stored in memory (e.g. one of the peripherals 1904 in FIG. 19) and executed by panel processor 1902, or stored in program storage 1932 and executed by host processor 1928. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 20:
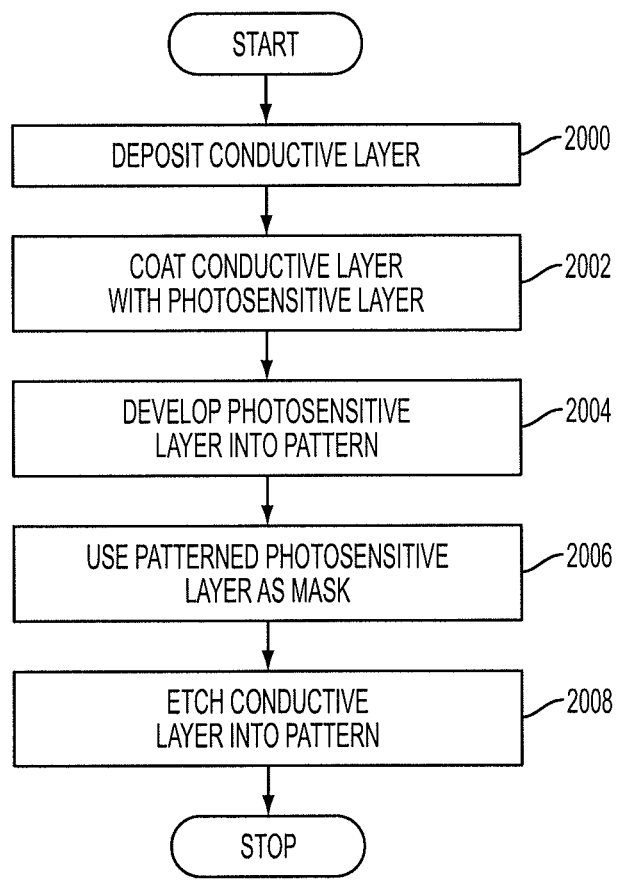
FIG. 20 illustrates an exemplary method for simplified patterning of layers of a thin film that can be used in an electronic device according to various embodiments.

FIG. 20 illustrates an exemplary method for simplified patterning of layers of a thin film that can be used in an electronic device according to various embodiments. In the example of FIG. 20, a conductive layer can be deposited on a surface (2000). The conductive layer can be coated with a photosensitive layer, e.g., a passivation layer (2002). The photosensitive layer can be developed into a desired pattern of the conductive layer (2004). The patterned photosensitive layer can be used as an etching mask for the conductive layer (2006). This can eliminate requiring a separate removable etching mask for the conductive layer. The conductive layer can be etched into the desired pattern based on the photosensitive layer (2008).

In some embodiments, excess portions of the photosensitive layer can be removed after the conductive layer is etched. In some embodiments, the photosensitive layer and the conductive layer can be patterned either together or in succession.

Although the invention has been fully described in connection with embodiments thereof with reference to the accompanying drawings, it is to be noted that various changes and modifications will become apparent to those skilled in the art. Such changes and modifications are to be understood as being included within the scope of the invention as defined by the appended claims.

What is claimed is:
1. A method comprising:
depositing a first conductive layer onto a surface;
patterning a dielectric layer on the first conductive layer;
patterning the first conductive layer using the patterned dielectric layer as a first mask;
depositing a second conductive layer onto the patterned dielectric layer;

patterning a passivation layer on the second conductive layer; and patterning the second conductive layer using the patterned passivation layer as a second mask.

2. The method of claim 1, wherein the surface includes a patterned black mask layer, the method comprising:
  depositing the black mask layer onto a substrate;
  applying a removable third mask to the black mask layer; and
  patterning the black mask layer based on the applied third mask.

3. The method of claim 1, wherein the first conductive layer is a metal layer and the second conductive layer is an indium-tin-oxide layer.

4. The method of claim 1, wherein the first conductive layer is an indium-tin-oxide layer and the second conductive layer is a metal layer.

5. The method of claim 1, wherein patterning the dielectric layer comprises:
  applying a removable photosensitive mask having a pattern to the dielectric layer;
  exposing the removable photosensitive mask to light; and
  developing the dielectric layer to have the pattern of the removable photosensitive mask.

6. The method of claim 1, wherein the first conductive layer and the dielectric layer have a same pattern.

7. The method of claim 1, wherein patterning the passivation layer comprises:
  applying a removable photosensitive mask having a pattern to the passivation layer;
  exposing the removable photosensitive mask to light; and
  developing the passivation layer to have the pattern of the removable photosensitive mask.

8. The method of claim 1, wherein the second conductive layer and the passivation layer have a same pattern.

9. The method of claim 1, comprising:
  forming a conductive bridge configured to transmit signals along the first and second conductive layers; and
  forming a bonding area configured to connect to other circuitry via at least one of the first or second conductive layer.

10. A method comprising:
  depositing a first conductive layer onto a surface;
  patterning a removable photosensitive layer on the first conductive layer;
  patterning the first conductive layer using the patterned photosensitive layer as a first mask;
  patterning a black mask layer onto the patterned first conductive layer using a removable second mask;
  depositing a second conductive layer onto the patterned black mask layer;
  patterning a passivation layer on the second conductive layer; and
  patterning the second conductive layer using the patterned passivation layer as a third mask.

11. The method of claim 10, wherein patterning the removable photosensitive layer comprises developing the photosensitive layer into a pattern of a removable mask.

12. The method of claim 10, wherein patterning the first conductive layer comprises forming a same pattern as the patterned photosensitive layer.

13. The method of claim 10, wherein patterning the passivation layer comprises developing the passivation layer into a pattern of a removable mask.

14. The method of claim 10, wherein patterning the second conductive layer comprises forming a same pattern as the patterned passivation layer.

15. The method of claim 10, comprising removing the photosensitive layer.

16. A method comprising:
  depositing a first conductive layer onto a surface;
  patterning a black mask layer on the first conductive layer;
  patterning the first conductive layer using the patterned black mask layer as a first mask;
  depositing a second conductive layer onto the patterned black mask layer;
  patterning a passivation layer on the second conductive layer; and
  patterning the second conductive layer using the patterned passivation layer as a second mask.

17. The method of claim 16, wherein depositing the first conductive layer comprises depositing a conductive layer onto the surface to form a first set of conductive traces and a second set of conductive traces crossing each other, and to form conductive bridges at the crossings of the first and second sets of conductive traces, the first and second sets of conductive traces and the conductive bridges for transmitting signals.

18. The method of claim 16, wherein depositing the second conductive layer comprises depositing a metal layer onto the black mask layer to form multiple conductive traces adjacent to each other, the multiple conductive traces for bonding to other circuitry.

* * * * *

UNITED STATES PATENT AND TRADEMARK OFFICE
CERTIFICATE OF CORRECTION

PATENT NO. : 8,475,872 B2
APPLICATION NO. : 12/626536
DATED : July 2, 2013
INVENTOR(S) : Sunggu Kang et al.

Page 1 of 1

It is certified that error appears in the above-identified patent and that said Letters Patent is hereby corrected as shown below:

In the Claims

At Column 18, line 17, claim number 13, please delete the word "removable."

Signed and Sealed this
Twenty-ninth Day of October, 2013

Teresa Stanek Rea
*Deputy Director of the United States Patent and Trademark Office*